(12) United States Patent
Aleksic et al.

(10) Patent No.: US 7,606,429 B2
(45) Date of Patent: Oct. 20, 2009

(54) BLOCK-BASED IMAGE COMPRESSION METHOD AND APPARATUS

(75) Inventors: Milivoje Aleksic, Richmond Hill (CA); Aaftab Munshi, Los Gatos, CA (US); Charles D. Ogden, Los Gatos, CA (US)

(73) Assignee: ATI Technologies ULC, Markham, Ontario (CA)

( * ) Notice: Subject to any disclaimer, the term of this patent is extended or adjusted under 35 U.S.C. 154(b) by 1004 days.

(21) Appl. No.: 11/090,378

(22) Filed: Mar. 25, 2005

(65) Prior Publication Data

US 2006/0215914 A1   Sep. 28, 2006

(51) Int. Cl.
G06K 9/36 (2006.01)
(52) U.S. Cl. .................. 382/232; 382/235; 382/244; 358/3.26; 358/3.27
(58) Field of Classification Search .......... 382/232, 382/235, 244, 251, 274; 358/3.26, 3.27, 358/463
See application file for complete search history.

(56) References Cited

U.S. PATENT DOCUMENTS

| | | | |
|---|---|---|---|
| 4,580,134 | A | 4/1986 | Campbell et al. |
| 4,821,208 | A | 4/1989 | Ryan et al. |
| 4,887,151 | A | 12/1989 | Wataya |
| 4,974,071 | A | 11/1990 | Maeda |
| 5,045,852 | A | 9/1991 | Mitchell et al. |
| 5,046,119 | A | 9/1991 | Hoffert |
| 5,047,853 | A | 9/1991 | Hoffert et al. |
| 5,218,431 | A | 6/1993 | Gleicher et al. |
| 5,287,200 | A | 2/1994 | Sullivan et al. |
| 5,430,464 | A | 7/1995 | Lumelsky |

(Continued)

FOREIGN PATENT DOCUMENTS

JP   5216993   8/1993

(Continued)

OTHER PUBLICATIONS

Belur V. Dasarathy; Image Data Compression—Block Truncation Coding; IEEE; pp. 55-121; Los Alamitos, California.

(Continued)

Primary Examiner—Yosef Kassa
(74) Attorney, Agent, or Firm—Vedder Price P.C.

(57) ABSTRACT

A block-based image compression method and encoder/decoder circuit compresses a plurality of pixels having corresponding original color values and luminance values in a block according to different modes of operation. The encoding circuit includes a luminance-level-based representative color generator to generate representative color values for each of a plurality of luminance levels derived from the corresponding luminance levels to produce at least a block color offset value and a quantization value. According to mode zero, each of the pixels in the block is associated with one of the plurality of generated representative color values to generate error map values and a mode zero color error value. According to mode one, representative color values for each of at least three luminance levels are also generated to produce at least three representative color values, corresponding bitmap values and a mode one color error value. A mode based compressed data generator is capable of operating in mode zero and/or one and produces block color mode zero data when the mode zero color error value is less than the mode one color error value, otherwise block color mode one data.

45 Claims, 12 Drawing Sheets

U.S. PATENT DOCUMENTS

| | | | |
|---|---|---|---|
| 5,452,017 A | 9/1995 | Hickman | |
| 5,463,700 A | 10/1995 | Nakazawa | |
| 5,544,286 A | 8/1996 | Laney | |
| 5,552,832 A | 9/1996 | Astle | |
| 5,576,845 A | 11/1996 | Komatsu | |
| 5,585,944 A | 12/1996 | Rodriguez | |
| 5,600,373 A | 2/1997 | Chui et al. | |
| 5,619,591 A | 4/1997 | Tsang et al. | |
| 5,682,249 A | 10/1997 | Harrington et al. | |
| 5,734,744 A | 3/1998 | Wittenstein et al. | |
| 5,742,892 A | 4/1998 | Chadda | |
| 5,748,174 A | 5/1998 | Wong et al. | |
| 5,748,904 A | 5/1998 | Huang et al. | |
| 5,787,192 A | 7/1998 | Takaichi et al. | |
| 5,805,226 A | 9/1998 | Jung | |
| 5,815,159 A | 9/1998 | Katayama et al. | |
| 5,822,460 A | 10/1998 | Kim | |
| 5,822,465 A | 10/1998 | Normile et al. | |
| 5,847,762 A | 12/1998 | Canfield et al. | |
| 5,877,819 A | 3/1999 | Branson | |
| 5,903,673 A | 5/1999 | Wang et al. | |
| 5,929,862 A | 7/1999 | Barkans | |
| 5,956,425 A | 9/1999 | Yoshida | |
| 5,956,431 A | 9/1999 | Iourcha et al. | |
| 5,959,631 A | 9/1999 | Knittel | |
| 5,978,511 A | 11/1999 | Horiuchi et al. | |
| 5,987,175 A | 11/1999 | Imaizumi et al. | |
| 6,005,971 A | 12/1999 | Bergman et al. | |
| 6,009,200 A | 12/1999 | Fujita et al. | |
| 6,031,939 A | 2/2000 | Gilbert et al. | |
| 6,052,203 A | 4/2000 | Suzuki et al. | |
| 6,075,619 A | 6/2000 | Iizuka | |
| 6,111,607 A | 8/2000 | Kameyama | |
| 6,125,201 A | 9/2000 | Zador | |
| 6,128,000 A | 10/2000 | Jouppi et al. | |
| 6,188,394 B1 | 2/2001 | Morein et al. | |
| 6,192,155 B1 | 2/2001 | Fan | |
| 6,195,024 B1 | 2/2001 | Fallon | |
| 6,285,711 B1 | 9/2001 | Ratakonda et al. | |
| 6,309,424 B1 | 10/2001 | Fallon | |
| 6,320,981 B1 | 11/2001 | Yada | |
| 6,349,151 B1 | 2/2002 | Jones et al. | |
| 6,438,165 B2* | 8/2002 | Normile | 375/240 |
| 6,529,631 B1 | 3/2003 | Peterson et al. | |
| 6,606,417 B1* | 8/2003 | Brechner | 382/240 |
| 6,614,449 B1 | 9/2003 | Morein | |
| 6,658,146 B1 | 12/2003 | Iourcha et al. | |
| 6,683,978 B1 | 1/2004 | Iourcha et al. | |
| 6,683,979 B1 | 1/2004 | Walker | |
| 6,687,410 B1 | 2/2004 | Brown | |
| 6,731,810 B1* | 5/2004 | Miura et al. | 382/236 |
| 6,825,847 B1 | 11/2004 | Molnar et al. | |
| 6,944,332 B1* | 9/2005 | Brechner | 382/165 |
| 6,990,249 B2* | 1/2006 | Nomura | 382/254 |
| 7,050,641 B1 | 5/2006 | Kharitonenko | |
| 7,103,357 B2 | 9/2006 | Kirani et al. | |
| 7,158,271 B2 | 1/2007 | Sawada | |
| 7,177,371 B1 | 2/2007 | Hudson et al. | |
| 7,224,846 B2 | 5/2007 | Fujishiro et al. | |
| 7,352,300 B2 | 4/2008 | Fallon | |
| 7,355,603 B2 | 4/2008 | Donovan et al. | |
| 7,505,624 B2 | 3/2009 | Ogden et al. | |
| 2004/0081357 A1 | 4/2004 | Oldcorn et al. | |
| 2004/0161146 A1 | 8/2004 | Van Hook et al. | |
| 2004/0174379 A1 | 9/2004 | Collodi | |
| 2004/0228527 A1 | 11/2004 | Iourcha et al. | |
| 2006/0188163 A1 | 8/2006 | Elder | |

FOREIGN PATENT DOCUMENTS

| | | |
|---|---|---|
| WO | WO 97/08900 | 3/1997 |
| WO | WO 99/18537 | 4/1999 |

OTHER PUBLICATIONS

Andreas Schilling, Wolfgang Strasser, Gunter Knittel; Texram: A Smart Memory for Texturing; May 1996; IEEE Computer Graphics and Applications.

Graham Campbell; Two Bit/Pixel Full Color Encoding; 1984; vol. 20, No. 4; Dallas.

Ching-Yung Yang, Ja-Chen Lin; Hybrid Adaptive Block Truncation Coding for Image Compression; Apr. 1997; Society of Photo-Optical Instrumentation Engineers; Taiwan.

Anders Kugler; High-Performance Texture Decompression Hardware; 1997; The Visual Computer.

Panos Nasiopoulos, Rabab K. Ward and Daryl J. Morse; Adaptive Compression Coding; Aug. 1991; IEEE Transactions on Communications, New York, U.S.

G. Knittel, A Schilling, A. Kugler and W. Strasser; Hardware for Superior Texture Performance.

Edward J. Delp and Robert O. Mitchell; Image Compression Using Block Truncation Coding; 1979; IEEE.

C. Y. Yang and J. C. Lin; Use of Radius Weighted Mean to Cluster Two-Class Data; May, 1994; vol. 30, No. 10; Electronics Letters.

John C. Russ; Optimal Grey Scale Images from Multiplane Color Images; 1995; vol. 7, No. 4; Journal of Computer-Assisted Microscopy.

Yushu Feng and Nasser M. Nasrabadi; A Dynamic Address Vector Quantization Algorithm Based on Inter-Block and Inter-Color Correlation for Color Image Coding; 1989; IEEE.

K. T. Lo and W. K. Cham; New Predictive Classified Vector Quantization Scheme for Image Compression; Aug. 1994; vol. 30, No. 16; Electronics Letters.

Kowk-Tung Lo and Wal-Kuen Cham; New Classified Vector Quantization of Images; 1993; IEEE, Beijing.

Edward J. Delp and Owen Robert Mitchell; Moment Preserving Quantization; 1991; IEEE.

Bing Zeng and Yrjo Neuvo; Interpolative BTC Image Coding with Vector Quantization; 1993; IEEE.

Maximo D. Lema and O. Robert Mitchell; Absolute Moment Block Truncation and Its Application to Color Images;1984; IEEE.

Yiyan Wu and David C. Coll; Single Bit-Map Block Truncation Coding of Color Images; 1992; IEEE.

Mohammed Kamel, C. T. Sun and Lian Guan; Image Compression by Variable Block Truncation Coding with Optimal Threshold; 1991; IEEE.

B. Zeng; Two Interpolative BTC Image Coding Schemes; Jun. 1991; Electronics Letters.

Y. A. Alsaka and D. A. Lee; Three Level Block Truncation Coding; 1990; IEEE.

E. Walach; A Modified Block Truncation Coding Technique for Image Compression; 1983; IEEE.

Bernd Lamparter and Wolfgang Effelsberg; eXtended Color Cell Compression—A Runtime-efficient Compression Scheme for Software Video.

Takio Kurita and Nobuyuki Otsu; A Method of Block Truncation Coding for Color Image Compression; 1993; IEEE.

Soo-Chang Pei and Ching-Min Cheng; A Novel Block Truncation Coding of Color Images Using a Quaternion-Moment-Preserving Principle; 1997, IEEE.

Tak Po Chan; Bing Zeng and Ming L. Liou; Visual Pattern BTC with Two Principle Colors for Color Images; 1995; IEEE.

Quoping Qiu; Color Image Coding and Indexing Using BTC; 1994; IEEE.

K. W. Chan and K. L. Chan; Optimized Adaptive AMBTC; 1994; IEEE.

Eric Dubois; Effects of Digital Demodulation on Component Coding of NTSC Color Signals 1979; IEEE.

European Patent Office, International Search Report issued on Jul. 14, 2006 for application No. PCT/IB2006/000700, entitled "Block-Based Image Compression Method & Apparatus", Inventors: Aleksic, Munshi & Ogden.

Hui, L., "An adaptive block truncation coding algorithm for image compression" ICASSP 90. 1990 International Conference on Acoustics, Speech and Signal Processing, Apr. 3, 1990, pp. 2233-2236, XP010641631.

Goeddel T.W. et al., "A Two-Dimensional Quantizer for Coding of Digital Imagery", IEEE Transactions on Communications USA, vol. COM-29, No. 1, Jan. 1981, pp. 60-67, XP002390138, ISSN: 0090-6778.

Franti, P. et al., "Compression of Digital Images by Block Truncation Coding: A Survey", Computer Journal, Oxford University Press, Surrey, GB, vol. 37, No. 4, Jan. 1994.

Yang, C-Y, et al., "Hybrid Adaptive Block Truncation Coding for Image Compression" Optical Engineering, Soc. of Photo-Optical Instrumentation Engineers, Bellingham, U.S., vol. 36, No. 4, Apr. 1997.

* cited by examiner (MODE ZERO)

(MODE ONE)

(MODE ZERO AND/OR ONE)

(MODE 0)

(MODE 1)

BLOCK-BASED IMAGE COMPRESSION METHOD AND APPARATUS

FIELD OF THE INVENTION

The invention relates generally to data compression and decompression methods and, more particularly, to image compression and decompression of image data.

BACKGROUND OF THE INVENTION

Data compression is an extremely useful tool for storing and transmitting large amounts of data. For example, when compression is used to decrease the number of bits relative to the original image size, the amount of data transmitted is reduced and the time required to transmit the image can be reduced For instance, it is known for a graphics processor to compress texture values representing an image. The compressed texture values may then be transmitted from one device to another, such as a computer, handheld device, portable phone, personal data assistant (PDA), wireless communication network or any suitable network element.

Block truncation coding (BTC) is an image processing technique for encoding and decoding digital image data, based on N×M (e.g., four-by-four) nonoverlapping "pixel" blocks. Color cell compression (CCC) is one example of extending the BTC method to color in BTC. The pixels of the block are partitioned into two groups, a representative color is chosen for each of these two groups, and a bitmap is generated with individual bits to indicate which group each pixel in the block is associated with. The compressed data for such a block typically consists of only two color values, or two color indices into a color palette, and the bitmap indicating which of the two groups each pixel belongs to. However, encoding only two colors for any given block may result in poor image quality, especially for blocks with diverse colors.

Digital color images may be compressed by encoding the chrominance (color) and luminance (brightness) values for each pixel contained therein. The color values may be described using a three component color space, such as an RGB component color space, where R represents the color red, G represents the color green and B represents the color blue. Eight-bit color values for each component may range from 0 to 255, with 255 representing the maximum amount of color or the highest value in the range. The combination of three eight-bit color components results in a 24-bit total color value per pixel. However, any number of bits per color, such as 16 bits, 32 bits, 64 bits or any other suitable number of bits, may represent the color of a pixel. Colors may alternatively be represented by a YIL color space, as is known in the art. Yet another color space, the CIE L*a*b* color space, represents a color based on components of luminance, labeled L*, a relative amount of red versus green, labeled a*, and a relative amount of yellow versus blue, labeled b*. Colors in these color spaces are then blended together in appropriate ways in order to produce a full spectrum of colors. In the L*a*b* luminance-chrominance color space, an L*=0 (luminance) value means that no light is present (i.e., the pixel location is completely black), while a*=0 means no red or green is present and b*=0 means that the pixel location is neither blue nor yellow. The occurrence of both a*=0 and b*=0 together means that the pixel location is gray (somewhere between black and white). In contrast, the hexidecimal value 255 represents the maximum amount of a color or the highest value in the range (maximum light/white, red and yellow, respectively, for L*a*b*). Similarly, in a gray-scale pixel map, pixel values may range from 0 for black to 255 for the whitest tone possible.

Since BTC/CCC methods quantize each block to just two representative colors or luminance values, image degradation may be significant. Some variations of BTC/CCC encode two representative colors, but imply one or two additional colors based on the two encoded colors. If the colors in the block are relatively dispersed, such as when the colors include near black and bright colors, then the two representative colors, may not properly represent the colors in the original image. For example, if the two representative color values represent the intermediate colors, then the two representative color values may not accurately represent extreme colors, such as black and white. If the two color levels that are selected to represent each block are not properly representative of the block, then the colors in the final decoded output image may not accurately represent those in the original image.

BTC/CCC methods are also known to encode pixel information for each of the colors red, green and blue as separate BTC/CCC blocks. As a result, these methods produce six code words (i.e. R1, R2, G1, G2, B1, B2) and three separate bitmaps to indicate how each channel should be reconstructed. This method of adapting BTC to color comes at the cost of bitmap data that is three times larger than the other algorithms use.

A variation of CCC stores two encoded colors as eight-bit indices into a 256-entry code book lookup table. However, such pixel blocks cannot be decoded without fetching additional information, which increases computational complexity and can consume additional memory bandwidth. Further, the transmission of a code book decreases system performance due to the increased data transmission and the additional overhead due to the required memory accesses to translate code words via the code book. As a result, these methods may be memory-intensive in terms of speed and bandwidth, and further may require large amounts of memory. Additionally, two colors may not properly represent diverse colors in the original image.

BTC methods are also known to perform three-level block truncation coding of color images. Two representative colors are encoded along with a bitmap containing two bits per pixel to indicate which of the three color levels each pixel belongs. One of the three color levels is derived from the two encoded colors—usually the color half way between them. A known extension of this method is to use the two bits per pixel in the bitmap to represent four levels instead of three and to derive the two additional colors one-third and two-thirds of the way between the two encoded colors. However, if the colors in the block are relatively dispersed, such as when the colors include near black, near white, and some other more saturated color, then the two encoded colors, along with any implied colors, may not properly represent the colors in the original image. Since blending two of the three colors will not produce the third color in this scenario, the final decoded image may not accurately represent those in the original image.

Four level CCC methods that encode two colors to provide for three or four colors are also known to further provide information on which pixels, if any, are transparent. The transparency block type indicates whether one of the color levels indicates an actual color level or indicates that the corresponding pixel is transparent. Further, according to this known method, the transparency block type is indicated based on whether one code word is greater than another, rather than on an encoded data bit.

BRIEF DESCRIPTION OF THE DRAWINGS

The present invention is illustrated by way of example and not limitation in the accompanying figures, in which like reference numerals indicate similar elements and in which.

DETAILED DESCRIPTION OF THE PREFERRED EMBODIMENTS

Figure 1:
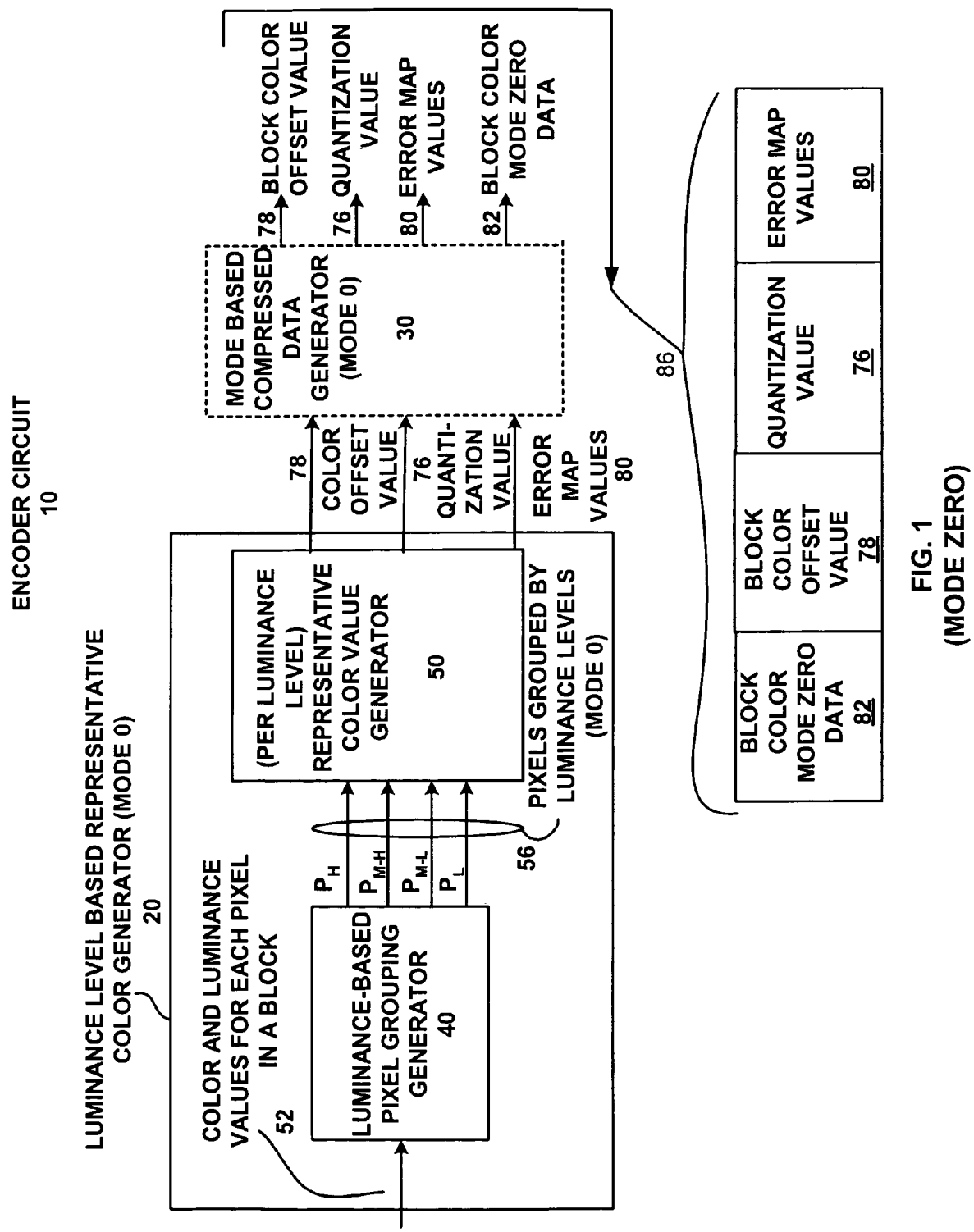
FIG. 1 is a block diagram illustrating one example of an apparatus to compress an image during mode zero in accordance with one exemplary embodiment of the invention.

A block-based image compression method and encoder/decoder circuit compresses a plurality of pixels in a block where each pixel includes a corresponding original color value and a corresponding luminance value according to different modes of operation. The encoding circuit includes a luminance-level-based representative color generator to generate representative color values for each of a plurality of luminance levels derived from the corresponding luminance levels to produce at least a high color value, a low color value, a block color offset value and a quantization value. In response to generating the representative color values, the luminance-level-based representative color generator associates each of the pixels in the block with one of the plurality of generated representative color values. According to one embodiment referred to as mode zero, the luminance-level-based representative color generator generates a pixel color error value for each of the original pixels in the block, based on the color values corresponding with each pixel in the block, the block color offset value and the quantization value, to produce error map values and a mode zero color error value.

According to one embodiment referred to herein as mode one, the luminance-level-based representative color generator generates representative color values for each of at least three luminance levels to produce at least three representative color values and a mode one color error value. In response to generating the at least three representative color values, the luminance-level-based representative color generator associates each of the pixels in the block with one of the at least three generated representative color values to produce corresponding bitmap values.

According to yet another embodiment referred to as mode zero and/or mode one, the encoder circuit further includes a mode based compressed data generator capable of encoding the plurality of pixels in the block to generate either the block color mode zero data or the block color mode one data. The mode based compressed data generator generates block color mode zero data when the mode zero color error value is less than the mode one color error value, otherwise the mode based compressed data generator generates the block color mode one data. For example, the block color mode zero data may indicate that the color values in the block are less diverse (i.e., softer) within the block than when the block color mode one data is generated (i.e., sharper).

Among other advantages, the encoder/decoder circuits and methods adapt to different levels of color diversity within the block in order to accurately represent the various colors in a block while achieving a high level of data compression. According to one embodiment, the encoder circuit identifies conditions when colors within the pixel block are relatively diverse. For example, when the various colors within the pixel block may be more accurately represented with two or more (i.e., four) colors, where two colors are derived, then the various colors within the pixel block may be said to be less diverse. (i.e., softer) Accordingly, the various colors within the block may be more accurately represented using four color values during mode zero. However, if the various colors within the pixel block may be more accurately represented with three color values, then the various colors within the pixel block may be said to be relatively more diverse and mode one is established. As a result, the encoder circuit during mode one may more accurately represent diverse colors within the block without having to rely on deriving or interpolating one or more intermediate color values within the block. Since the encoder circuit generates three actual color values during mode one, rather than an estimated or interpolated color value, the resulting decoded image will more accurately represent the original image even when the color values within the block are relatively diverse. However, if the color values within the block are more accurately represented using two or more (i.e., four) color values where some (i.e., two) of the color values are derived during decoding, then the color values in the block may more accurately reproduce the original image using the two or more (i.e., four) color valves. Further, more than two modes may be used to achieve even greater color reproduction accuracy.

The encoder/decoder circuit and method produce excellent texture image quality while achieving a high level of compression in a relatively easily implemented and efficient manner. As a result, the encoder and/or decoder circuit and method are inexpensively implemented in software and/or hardware, making the encoder and/or decoder circuit and method suitable for set-top/desktop network element and handheld devices where memory footprint and power consumption may be constrained. As used herein, handheld devices may include wireless devices, including mobile telephones; personal digital assistants; navigation devices, including portable navigation devices; digital cameras; video cameras; or any other suitable portable devices, including devices suitable for transmitting or receiving image data. As used herein, network elements may include any component of a networked communication system such as a wireless communication system or any suitable system.

FIG. 1 is a block diagram of an encoder circuit 10 to compress a plurality of pixels in a block during mode zero according to one embodiment of the invention. The encoder circuit 10 includes a luminance-level-based representative color generator 20 and a mode based compressed data generator 30. The luminance-level-based representative color generator 20 further includes a luminance-based pixel grouping generator 40 and a representative color value generator 50.

Figure 2:
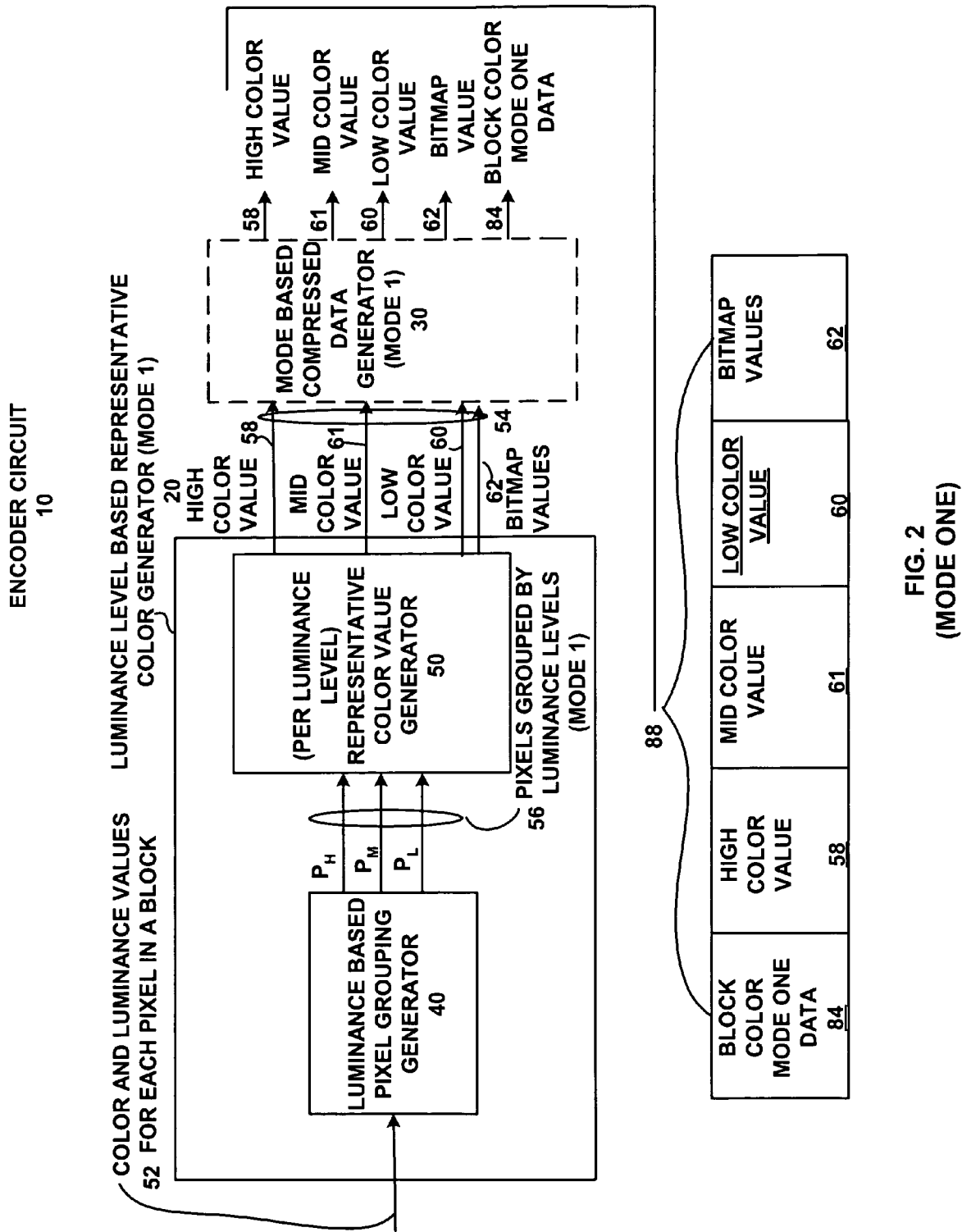
FIG. 2 is a block diagram illustrating one example of an apparatus to compress an image during mode one in accordance with another exemplary embodiment of the invention.

FIG. 2 is a block diagram of the encoder circuit 10 to compress a plurality of pixels in a block when in mode one according to another embodiment of the invention. According to this embodiment, the mode based compressed data generator 30, the luminance-based pixel grouping generator 40 and the per luminance level representative color value generator 50 each function according to mode one as described in more detail below.

Figure 3:
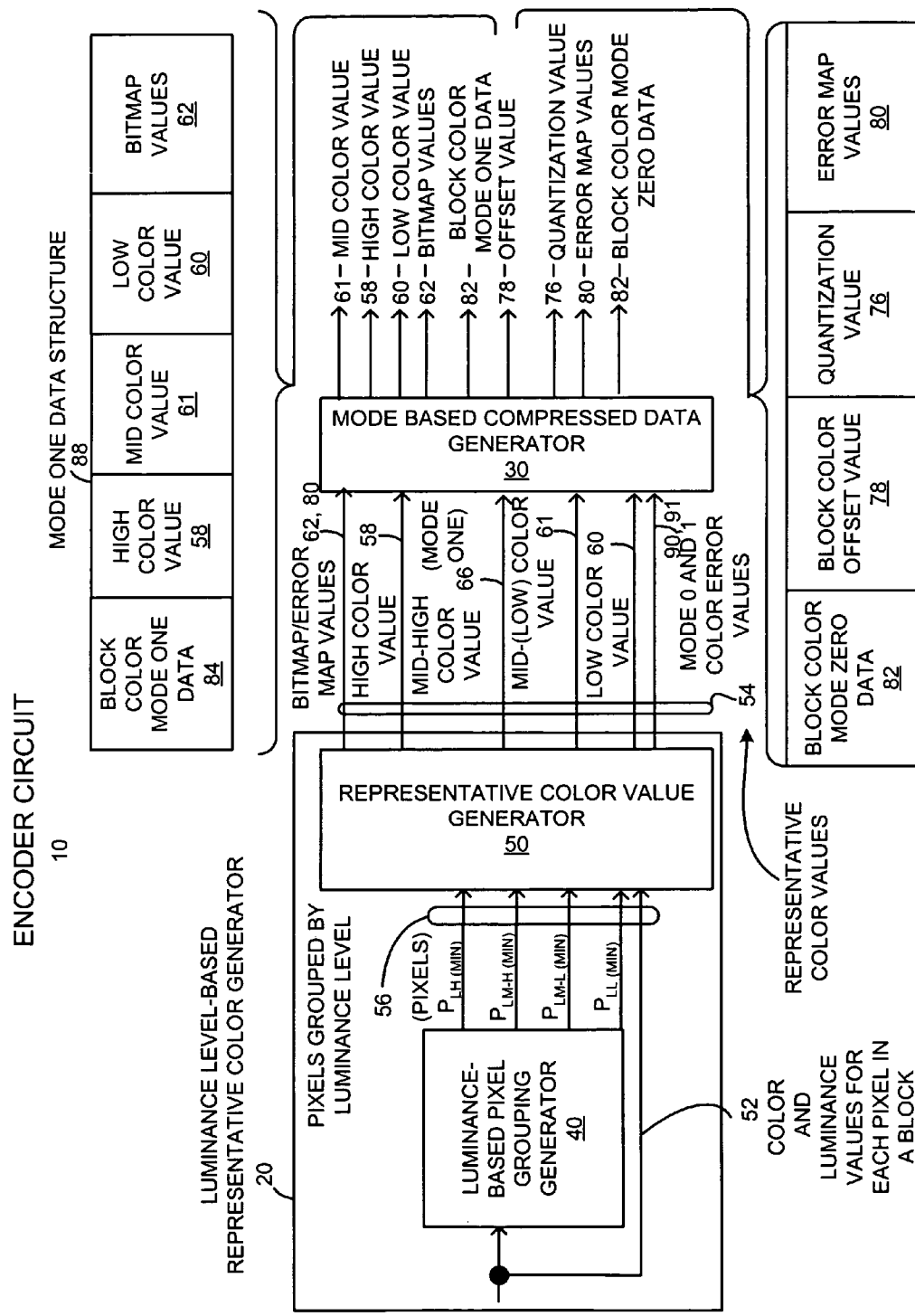
FIG. 3 is a block diagram illustrating one example of an apparatus to compress an image during mode zero and/or mode one in accordance with another exemplary embodiment of the invention.

FIG. 3 is a block diagram of the encoder circuit 10 capable of operating during mode zero and/or mode one. According to this embodiment, the mode based compressed data generator 30, the luminance-based pixel grouping generator 40 and the per luminance level representative color value generator 50 function according to mode zero and/or mode one.

Figure 7:
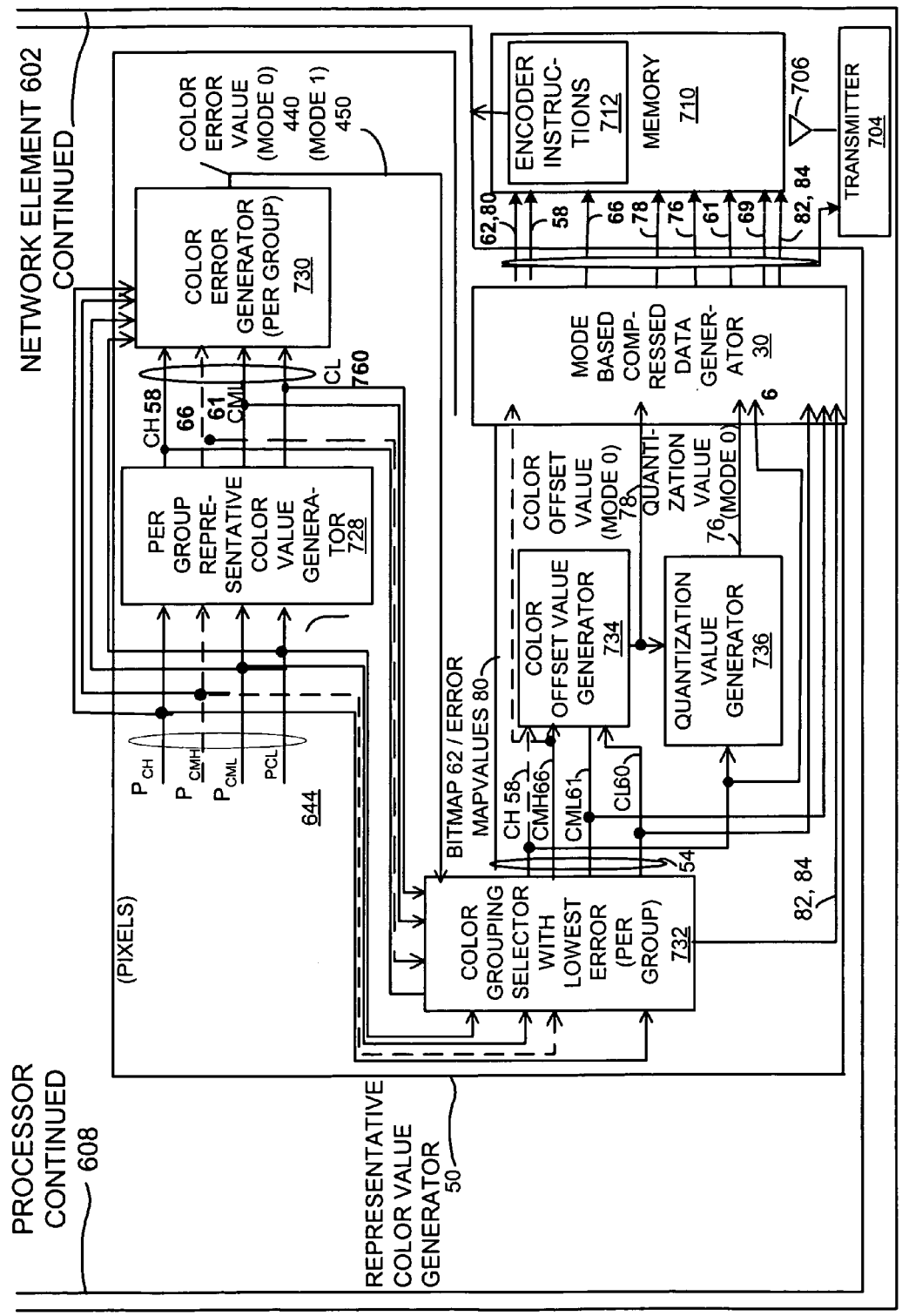
FIG. 7 is a block diagram illustrating one example of a representative color value generator in accordance with one exemplary embodiment of the invention.
Figure 9:
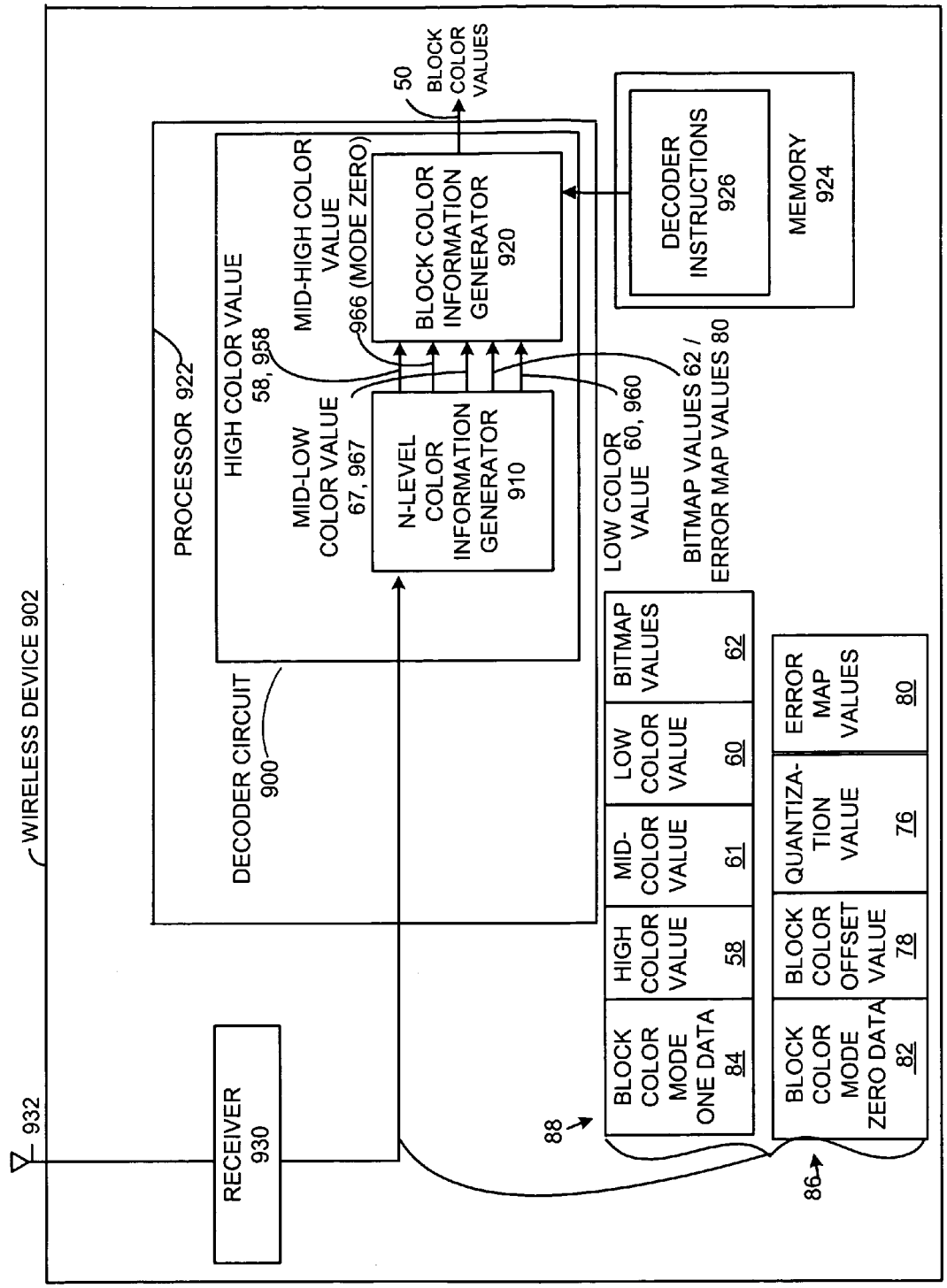
FIG. 9 is a block diagram illustrating an example of a decoder circuit in accordance with one exemplary embodiment of the invention.

The encoder circuit 10 including the mode based compressed data generator 30, the luminance-level-based representative color generator 20, the luminance-based pixel grouping generator 40 and the per luminance level representative color value generator 50 may be software modules or drivers operating in a single microprocessor or may each be one or more suitably programmed processors, such as a microprocessor, a microcontroller or a digital signal processor (DSP), and therefore may further include memory as shown in FIGS. 7 and 9 containing instructions that, when executed, cause the encoder circuit 10 to carry out the operations described herein. In addition, the encoder circuit 10, including the luminance-level-based representative color generator 20, the mode based compressed data generator 30, the luminance-based pixel grouping generator 40 and the representative color value generator 50 may include discrete logic state machines, or any other suitable combination of hardware, software, middleware and/or firmware. The various elements of the encoder circuit 10 may be connected by a plurality of links. The links may be any suitable mechanism for conveying electrical signals or data, as appropriate.

According to one embodiment, the encoder circuit 10 and/or decoder circuit 900 (FIG. 9) may be part of a wired or wireless telephone, a satellite receiver and/or transmitter, a cable box, a suitable set top box, the head end of a system device, a processor based system, a network element or any suitable device. For example, the encoder circuit 10 may be part of a computer device or system, notebook computer, laptop computer, network element or any portable computer or other processor-based system. According to one embodiment, the encoder circuit 10 may be part of a processor-based game device suitable for operating on a network element or any suitable device for processing and/or rendering video and audio from a gaming application. The gaming applications may include well known video game applications (e.g., racing, fighting and hunting). The computer system or other processor-based system may include a central processing unit, video-graphics circuitry, system memory and other suitable circuits peripheral to the central processing unit. In such systems, the central processing unit functions as a host processor, while the video-graphics circuit (e.g., a graphics coprocessor) functions as a loosely coupled coprocessor. By way of example, the video-graphics circuitry may include an integrated circuit on a single semiconductor die, such as an application-specific integrated circuit (ASIC). Additionally, the video-graphics circuitry may include memory as shown in FIGS. 7 and 9, such as, but not limited to, dynamic random access memory (DRAM), programmable random access memory (PRAM), erasable programmable read only memory (EPROM), static memory or any other suitable type of memory. This memory may reside on the same semiconductor die (i.e., ASIC) as the video-graphics circuitry or the memory may be separately connected through board-level or package-level traces. Similarly, the memory may be part of system memory, graphics memory or any other suitable memory. According to one embodiment, the operations described herein may be implemented on a software program or application, including a driver program, executed by the host processor or other suitable processor.

Figure 4:
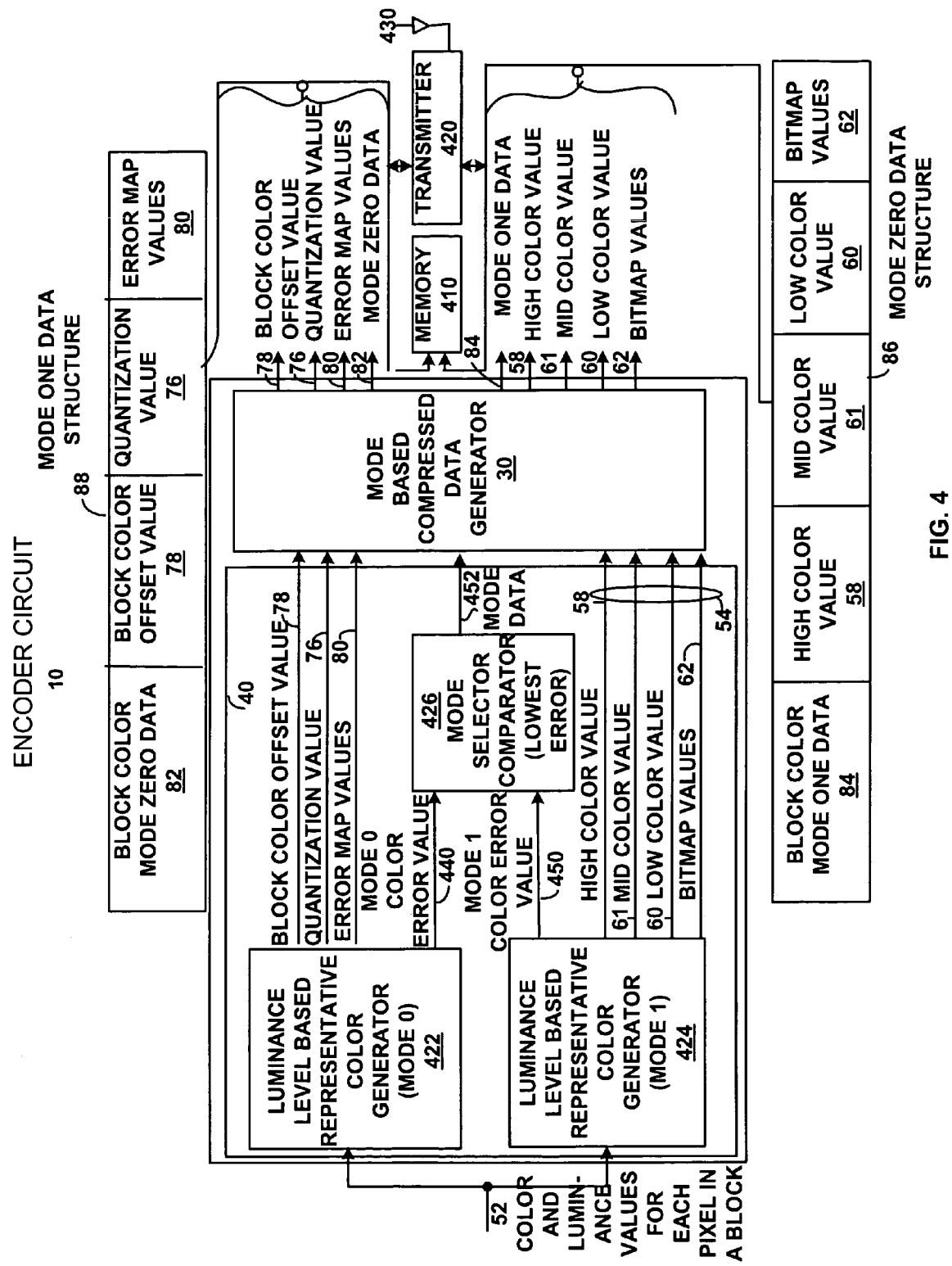
FIG. 4 is a block diagram illustrating one example of an apparatus to compress an image in accordance with another exemplary embodiment of the invention.

FIG. 4 is a block diagram of the encoder circuit 10 to compress color and luminance values for each pixel in a block 52 according to one embodiment of the invention. According to this embodiment, the encoder circuit 10 further includes memory 410, a transmitter 420 and an antenna 430. The encoder circuit 10 further includes a mode zero luminance-level-based representative color generator 422, a mode one luminance-level-based representative color generator 424, a mode selector comparator (lowest error) 426, and the mode based compressed data generator 30.

Figure 5:
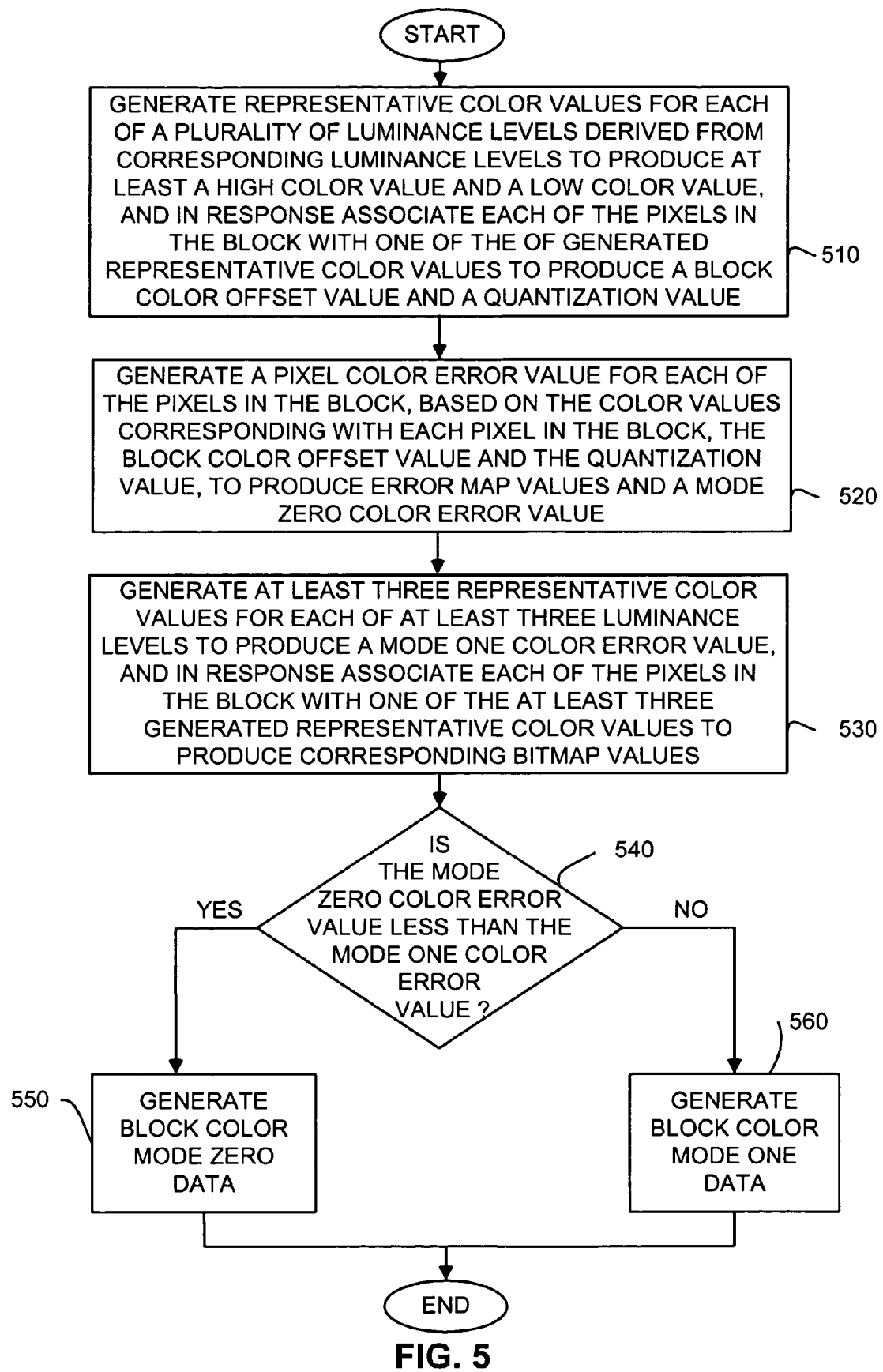
FIG. 5 is a flowchart illustrating an example of a method for compressing a plurality of pixels in a block (mode zero and/or mode one) in accordance with one exemplary embodiment of the invention.

FIG. 5 shows a method of compressing a plurality of pixels in a block according to one embodiment of the invention. The method may be carried out by the encoder circuit 10, as previously described with respect to FIGS. 1, 2, 3 and 4. However, any other suitable structure may also be used. It will be recognized that the method, beginning with block 510, will be described as a series of operations, but the operations may be performed in any suitable order and may be repeated in any suitable combination.

As shown in block 510, the luminance-level-based representative color generator 20 receives color and luminance values associated with each pixel in a block 52. In response, the luminance-level-based representative color generator 20 generates representative color values 54 for each of a plurality of luminance levels to produce at least a high color value 58 and a low color value 60. Additionally, the luminance-level-based representative color generator 20 associates each of the pixels in block 52 with one of the representative color values 54 to produce a quantization value 76 for each block and a block color offset value 78 for each block.

According to one embodiment, the color and luminance values associated with each pixel in the block 52 include eight bits for red color information, eight bits for green color information and eight bits for blue color information, for a total of 24 color bits. Further, the color and luminance values associated with each pixel in the block 52 may further include alpha or depth values as is known in the art. According to one embodiment, the color values associated with each pixel in the block may correspond with an RGB component color space, a CIE L*a*b* color space and a YIL color space, or any suitable color space.

As shown in block 520, the luminance-based pixel grouping generator 40 generates a pixel color error value for each of the pixels in the block, based on the color values corresponding with each pixel in the block, the block color offset value 78 and the quantization value 76 to produce error map values 80 and a mode zero color error value 440.

As shown in block 530, the luminance-based pixel grouping generator 40 generates for at least three luminance levels at least three representative color values 54 to produce a mode one color error value 450. In response, the luminance-level-based representative color generator 20 associates each of the pixels in block 52 with one of the at least three generated representative color values 54 to produce corresponding bitmap values 62.

As shown in block 550, the mode based compressed data generator 30 generates block color mode zero data 82 when the mode zero color error value 440 is less than the mode one color error value 450 as shown in block 540, otherwise the mode based compressed data generator 30 generates the block color mode one data 84. According to one embodiment, if the mode zero color error value 440 is less than a predetermined threshold, then the luminance-level-based representative color generator 40 generates block color mode zero data 82. Since the mode zero color error value 440 is less than the mode one color error value 450, the colors are relatively less diverse, i.e., indicating a soft image. As a result, there is no need to perform the calculations in block 560 for mode one.

As shown in block 540, if the mode one color error value 450 is less than the mode zero color error value 440, by a threshold level, then the mode based compressed data generator 30 will generate the block color mode one data 84 at block 540. The threshold level may be any suitable level that, when compared with the mode zero color error value 440, will indicate that the colors within the block are relatively less diverse, i.e., soft. The threshold may also be variable. According to one embodiment, the threshold level is a relative percentage where the threshold level may be 0, 10, 20 or 30 percent or any other suitable percentage value.

According to one embodiment, the mode based compressed data generator 30 generates data in a particular data structure such as a mode zero data structure 86 including at least the block color mode zero data 82, the block color offset value 78, the quantization value 76 and the error map values 80. Alternatively, the mode based compressed data generator 30 generates a mode one data structure 88 including at least the high color value 58, a mid color value 61, the bitmap values 62 and block color mode one data 84.

According to one embodiment, the mode zero data structure 86 includes a single bit for the block color mode zero data 82, seven bits for the block color offset value 78, eight bits for the quantization value 76 and thirty-two bits for the error map values 80 for a total of sixty-four bits. The error map values 80 correspond with a two-bit index associated with each of the sixteen pixel locations in the error map, for a total of thirty-two-bit error map values 80.

According to another embodiment, the mode one data structure 88 includes a single bit for the block color mode one data 84, fifteen bits for the high color value 58, sixteen bits for the mid color value 61, seven bits for the low color value 60 and twenty-five bits for the bitmap values 62. The bitmap values 62 are encoded so that each pixel representation may be associated with three different colors. For example, the encoded bitmap data within the bitmap values 62 may use base three arithmetic rather than conventional base two arithmetic in order to identify one of three colors for each pixel.

Accordingly, eight groups of three bitmap values 62 may be mapped to identify one of three states for two adjacent pixels. Any other mapping of the twenty-five bits allocated to the bitmap values 62 may be used to identify each of the three colors for each pixel value in the block.

According to one embodiment, if a total of only sixteen bits are used to represent the mid color value 61 then, for example, five bits may be used to represent the red color component, six bits may be used to represent the green color component and five bits may be used to represent the blue color component. If, however, fifteen bits are used to represent the low color value 60, then five bits may be used to represent the red color component, five bits may be used to represent the green color component, and five bits may be used to represent the blue color component. If only seven bits are used to represent the high color value 58, then two bits may be used to represent the red color component, three bits may be used to represent the green color component and two bits may be used to represent the blue color component. Since the color values typically have, for example, eight bits of information, the most significant bits from individual color values may be used to represent the corresponding colors associated with each pixel if fewer than eight bits are used. For example, the most significant five bits of the eight bits for each color in the color value associated with each pixel may be selected. Alternatively, any other suitable criteria or method may be used.

Figure 6:
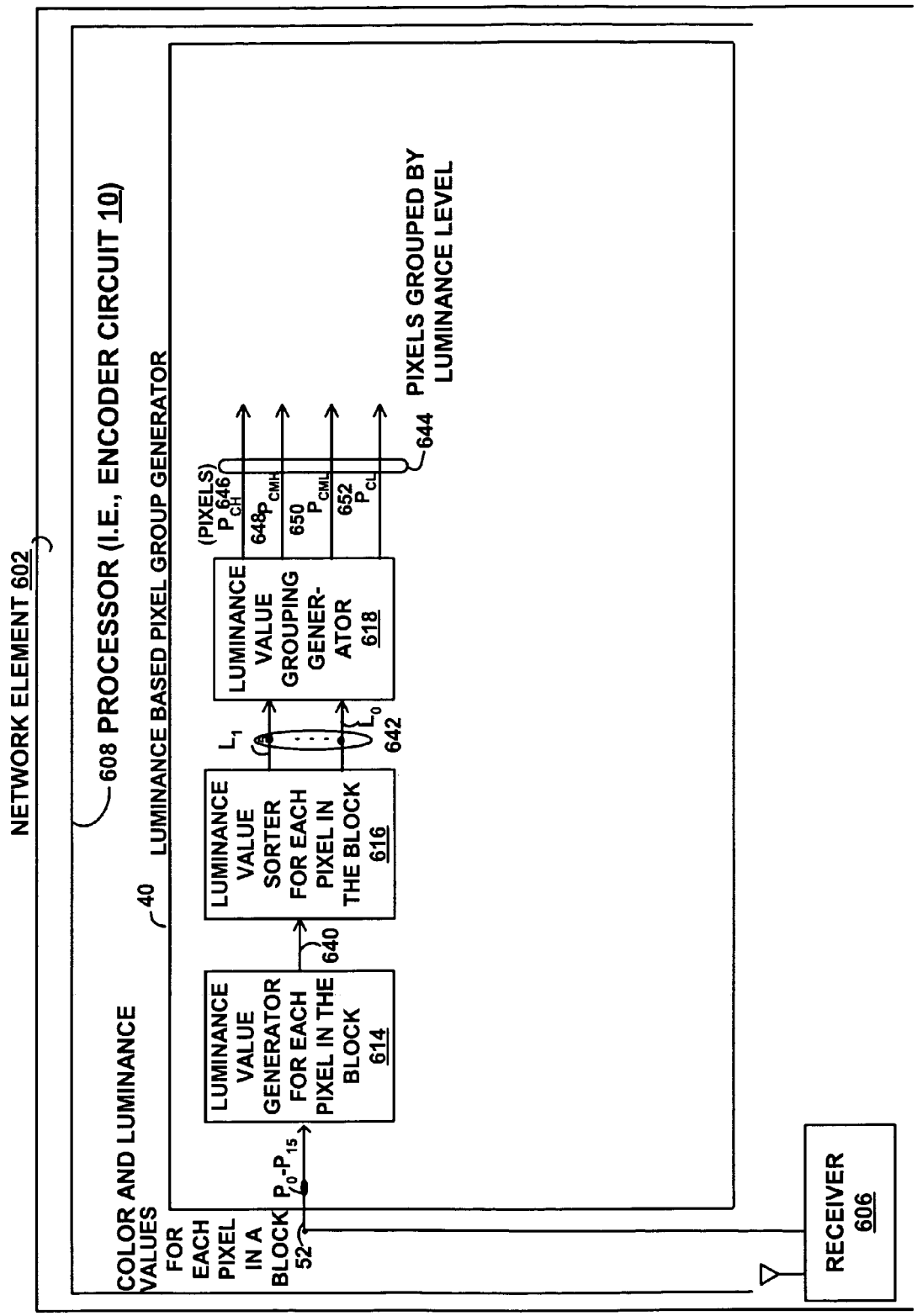
FIG. 6 is a block diagram illustrating one example of a luminance based pixel grouping generator according to one exemplary embodiment of the invention.

FIGS. 6 and 7 are block diagrams of a network element 602 including the encoder circuit 10, a transmitter 704 and optionally a receiver 606, according to another embodiment of the invention. According to one embodiment, the network element 602 may be a computer device executing an application, such as a gaming application. The transmitter 704 may be part of a wireless communication system such as the network element 602 or any suitable network element. The encoder circuit 10 may include one or more suitable processors such as a processor 600, a microprocessor, a microcontroller or a digital signal processor (DSP). The encoder circuit 10 includes associated memory, such as memory 710 containing encoder instructions 712 that, when executed, cause the processor 600 including the representative color value generator 50, the luminance-level-based representative color generator 20 and the mode based compressed data generator 30, to carry out the operations described herein. The various elements of the representative color value generator 50, the luminance-level-based representative color generator 20, the mode based compressed data generator 30 and the memory 710 are connected by a plurality of links. The links may be any suitable mechanism for conveying electrical signals or data, as appropriate.

The memory 710 may be, for example, random access memory (RAM), read-only memory (ROM), optical memory or any suitable storage medium located locally or remotely, such as a server or distributed memory if desired. Additionally, the memory 710 may be accessible by a wireless base station switching system or any suitable network element via the Internet, such as a wide area network (WAN), a local area network (LAN), a wireless wide access network (WWAN), a wireless local area network (WLAN) such as, but not limited to, an IEEE 802.11 wireless network, a Bluetooth® network, an infrared communication network, a satellite communication network or any suitable communication interface or network.

According to one embodiment, the encoder circuit 10 functions to compress image data represented by the color and luminance values for each pixel in a block 52 from within the network element 602. In response, the network element 602 then transmits the mode zero data structure 86 and/or the mode one data structure 88 over a wireless network via the transmitter 704 and an antenna 706. For example, the encoder circuit 10 may be located within a base station integrated within the wireless network so that the network element 602 may transmit the color and luminance value for each pixel in a block 52 in an uncompressed mode. The encoder circuit 10 may be physically located within the base station of the wireless network and may receive the unencoded color and luminance values for each pixel in a block 52 from a suitable processor based device executing an application such as a gaming application, for compression in order to produce data in the mode zero data structure 86 and/or the mode one data structure 88. In response, the base station may transmit the compressed data for decoding by a wireless device or by another network element such as a wireless base station. As will be discussed further with respect to the decoder, the encoder circuit 10 and/or decoder circuit may be integrated within one system element such as a wireless device, switching system or base station. Further, the encoder circuit 10 and/or decoder circuit may be located in separate elements such as within wireless devices and/or base stations or within a suitable switching system.

As shown in FIG. 6, the luminance-based pixel grouping generator 40 further includes a luminance value generator for each pixel in the block 614, a luminance value sorter for each pixel in the block 616 and a luminance value grouping generator 618.

As shown in FIG. 7, the representative color value generator 50 further includes a per group representative color value generator 728, a color error generator 730, a color grouping selector with lowest error 732, a color offset value generator 734 and a quantization value generator 736.

Figure 8:
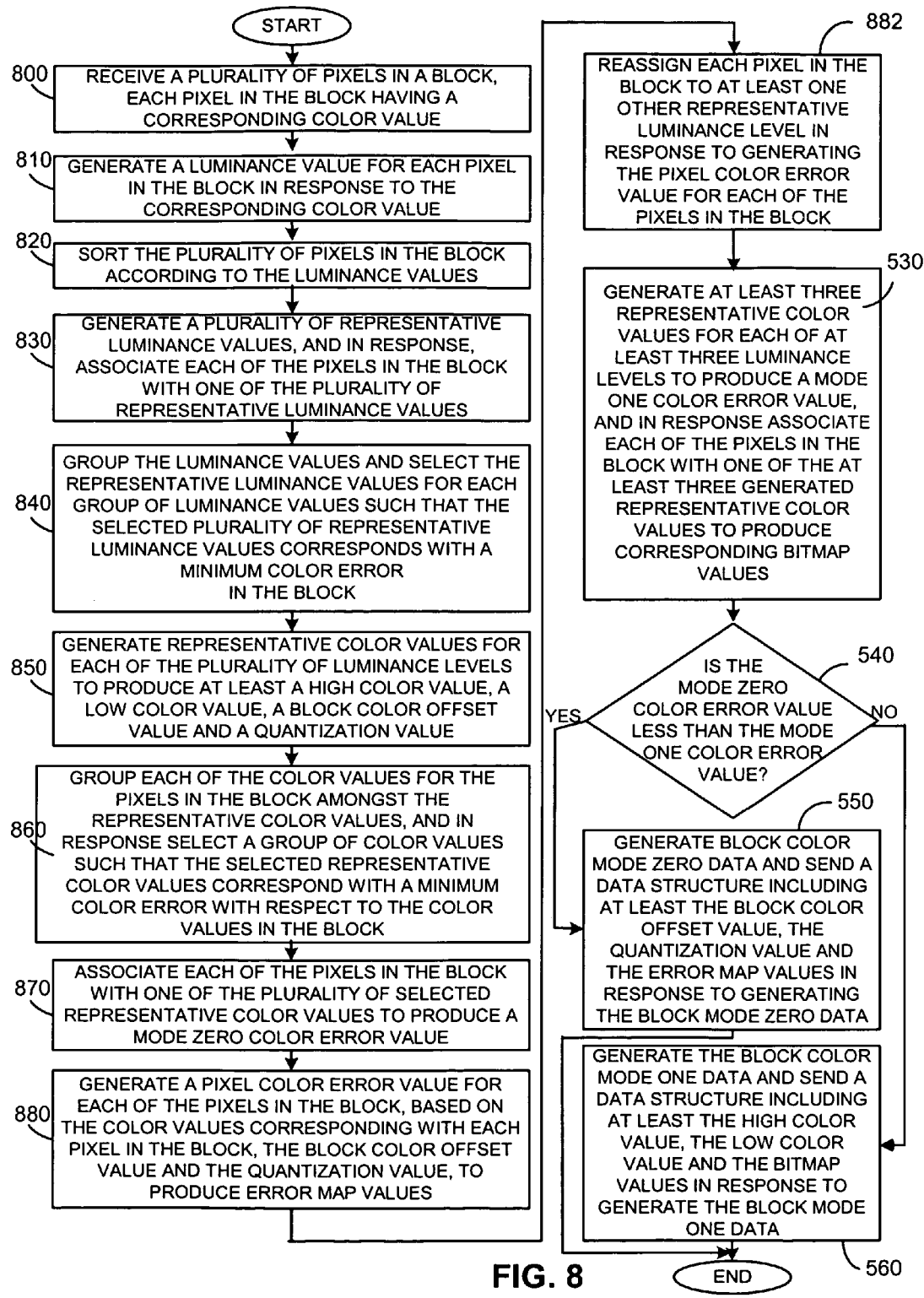
FIG. 8 is a flowchart illustrating another example of a method for compressing a plurality of pixels in a block according to another exemplary embodiment of the invention.

FIG. 8 illustrates a method of compressing an image according to another embodiment of the invention. The method may be carried out by the encoder circuit 10. However, any suitable structure may also be used. It will be recognized that the method, beginning with step 800, will be described as a series of operations; however, the operations may be performed in any suitable order and may be repeated in any suitable combination.

As shown in block 800, the luminance value generator for each pixel in the block 614 may receive the color values for each pixel in the block 52 and, as shown in block 810, in response, produce luminance values for each corresponding pixel in the block 640.

As shown in block 810, for example, the luminance values for each corresponding pixel in the block 640 may be calculated by the following equation:

Luminance value (R, G, B)=0.30*R+0.59*G+0.11*B.

However, any suitable weighting coefficients and any suitable equation may be used. According to one embodiment, the luminance value generator for each pixel in the block 614 may divide any image into a plurality of blocks where each block represents a four-by-four array of pixels. However, the image may be divided into a plurality of blocks at any stage and by any suitable device.

As shown in blocks 820 and 830, the luminance value sorter for each pixel in the block 616 sorts the plurality of pixels according to the luminance values for each corresponding pixel in the block 640 in order to produce sorted pixel luminance values 642. The luminance value grouping generator 618 receives the sorted pixel level values 642 and then, in response, produces groupings of pixels associated with the luminance level values 644. According to one embodiment, the grouping of pixels associated with the luminance levels 644 includes, for example, at least three, four, or any suitable number of representative luminance levels. The groupings of pixels may include a grouping of pixels associated with a high luminance level 646, a grouping of pixels associated with a medium-high luminance level 648, a grouping of pixels associated with pixels having a medium-low luminance level 650 and a grouping of pixels associated with a low luminance level 652.

As shown in block 840, the actual number of groupings provided by the luminance value grouping generator 618 may correspond with the number of desired luminance levels and the number of pixel combinations for each luminance level. For example, during mode zero, four luminance levels may be used, whereas during mode one, three luminance levels may be used. Any other suitable number of luminance levels may be used. According to one embodiment, the grouping of pixels associated with a high luminance level 646, may initially contain only the fifteenth pixel while varying the grouping of pixels associated with a low luminance level 652 from no pixels through all pixels except the fifteenth pixel. The grouping of pixels associated with a high luminance level 646, is then expanded to include the next lower luminance pixel (and thus, for example, after the first iteration would contain the fifteenth and fourteenth pixels) to generate all the remaining combinations for the grouping of pixels associated with a low luminance level 652. The luminance value grouping generator 618 may produce, for example, one hundred twenty different groupings of pixels based on luminance levels or any suitable number of different groupings.

As shown in blocks 850 and 860, for each grouping of pixels associated with various representative color values, the per group representative color value generator 728 generates representative color values 766. For example, for the pixels associated with the high color value 58, the per group representative color value generator 728 may generate the average of the color values or, alternatively, may select one color value to represent the color values. The remaining representative color values may be similarly calculated. As shown in block 820, the color error generator 730 produces the mode zero color error value 440 and/or the mode one color error value 450 based on comparing the representative color values 766 with the actual color values used to represent the pixel groupings for the plurality of color levels.

As shown in blocks 870 and 880, according to one embodiment, during mode zero the color error generator 730 may produce the mode zero color error value 440 and the mode one color error value 450 based on the following equation:

Color error value=$\Sigma[C_{ij} \times C_{ij}$−(color offset value+error value $_{ij}$×quantization value)×(color offset value+ error value $_{ij}$×quantization value)], Where $_{ij}$ identifies a particular pixel in the block such as a color value $C_{ij}$. The error map values 80 may be based on the following equation:

error value $_{ij}$=color value ($i$)−color offset value.

During mode one, the color error generator 730 may produce the mode one color error value 450 based on the following equation:

error value $_{ij}$=$\Sigma[C_{ij} \times C_{ij}$−color value $_{(i)}$×color value $_{(i)}$].

As shown in blocks 880 and 882, the color grouping selector with lowest error 732 receives the pixel groupings for the plurality of color levels 644, the representative color values 766 and the corresponding mode zero color error value 440 and/or the mode one color error value 450 for each of the various combinations of the groupings. In response, the color grouping selector with lowest error 732 determines the color groupings with the lowest mode zero color error values 440 and/or mode one color error values 450.

The color offset value generator 734 in response to receiving the high color value 58 and the low color value 60 produces the color offset value 78 during mode zero. According to one embodiment, the color offset value generator 734 produces the color offset value 78 based on the following equation:

$$\text{color offset value} = [\text{high color value} + \text{low color value}]/2.$$

Also, the quantization value generator 736, in response to receiving the color offset value 78 and the high color value 58, generates the quantization value 76 according to one embodiment based on the following equation:

$$\text{quantization value} = [\text{high color value} - \text{color offset value}]/M.$$

Where "M" represents the number of levels such as two, three or four or more, however, M may represent any suitable number of levels.

FIG. 9 is a block diagram of a decoder circuit 900. According to this embodiment, the decoder circuit 900 is part of a wireless device 902. The wireless device 902 includes a processor 922, memory 924, a receiver 930 and an antenna 932 according to one embodiment of the present invention. The processor 922 functions as, among other things, a decoder circuit 900. The decoder circuit 900 includes an N-level color information generator 910 and a block color information generator 920. The decoder circuit 900 may be one or more suitably programmed processors, such as processor 608, 922, such as a microprocessor, a microcontroller or a digital signal processor (DSP) and, therefore, includes the associated memory 924 containing decoder instructions 926 that, when executed, cause the decoder circuit 900 to carry out the operations described herein. In addition, the decoder circuit 900 as used herein may include discrete logic state machines or any other suitable combination of hardware, software, middleware and/or firmware. According to one embodiment, the decoder circuit 900 is a software module, application or driver executing on processor 922 within the wireless device 902.

Although the decoder circuit 900 is shown within wireless device 902, the decoder circuit 900 may alternatively be part of a wireless communication system such as a base station or a switching element or any suitable network element. According to one embodiment, the encoder circuit 10 may be part of the network element 602 and the decoder circuit 900 may be part of wireless device 902. The encoder circuit 10 receives, encodes and transmits an image as texture or color values for each pixel in a block 52 from the network element 602 to a wireless communication network for receipt by the wireless device 902. In response to receiving the compressed image in a data structure for a mode zero block type 86 and/or a data structure for a mode one block type 88, the decoder circuit 900 decodes the data structure for a mode zero block type 86 and/or a data structure for a mode one block type 88 and recreates the image. According to an alternative embodiment, the wireless device 902 includes the encoder circuit 10 and the network element 602 includes the decoder circuit 900. According to this embodiment, the wireless device 902 receives, encodes and transmits the texture or color values for each pixel in the block 52 to the network element 602.

Alternatively, the network element 602 may transmit an unencoded or uncompressed image to a wireless communication network where the encoder circuit 10 is within a wireless communication network element such as a base station or a switching system. In response to receiving the uncompressed image, the encoder circuit 10 then compresses the image and forwards the compressed image to a decoder circuit 900 within the wireless device 902 or to another suitable network element within the wireless communication system for decoding.

According to yet another embodiment, both the encoder circuit 10 and the decoder circuit 900 are part of the wireless device 902. Similarly, the encoder circuit 10 and the decoder circuit 900 are part of the network element 602.

According to one embodiment, the encoder circuit 10 and/or decoder circuit 902 may be part of a computer such as a personal computer. More specifically, the encoder circuit 10 and/or decoder circuit 900 may be part of any suitable component within the computer such as part of a central processor, or a coprocessor such as a video-graphics processor. Accordingly, the computer may receive an uncompressed image and compress the image via encoder circuit 10 for transmission to another suitable device including the decoder circuit 900, such as another computer, another wireless device, or a telephone, satellite receiver cable box or any other suitable device. Additionally, the encoder circuit 10 and decoder circuit 900 may be used to compress and decompress images for storage within memory of a computer system such as a hard disk drive, RAM or any other suitable memory.

Figure 10:
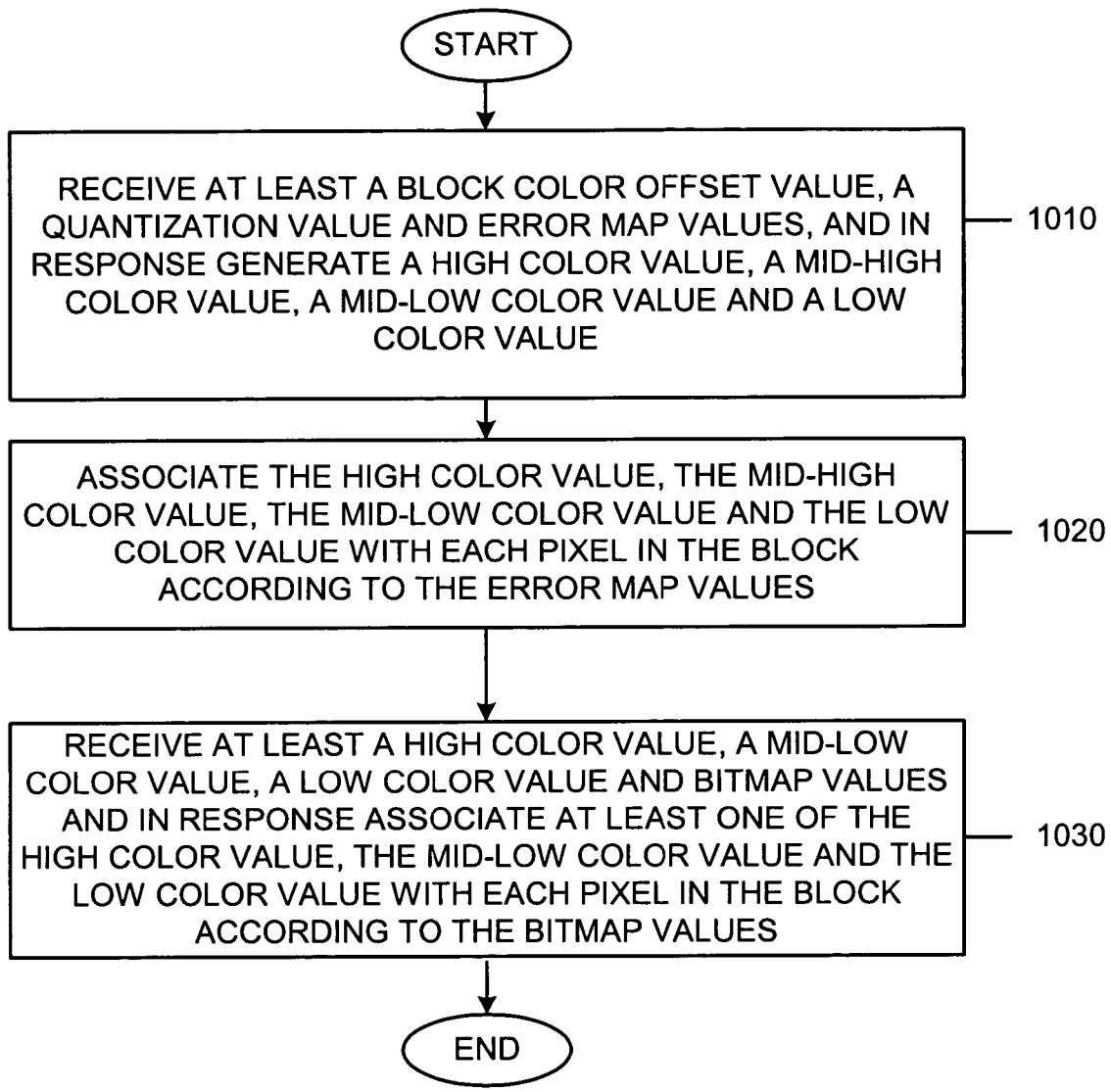
FIG. 10 is a flowchart illustrating one example of a method for decoding compressed data according to one exemplary embodiment of the invention.

FIG. 10 illustrates a decoding method according to one embodiment of the present invention. The method may be carried out by the decoder circuit 900. However, any other suitable structure may also be used. It will be recognized that the method will be described as a series of operations, but the operations may be performed in any suitable order and may be repeated in any suitable combination.

As shown in block 1010, the N-level color information generator 910 receives at least either the block color mode zero data 82, or the block color mode one data 84 and, in response, determines if the received data corresponds with the mode zero data structure 86 or the mode one data structure 88.

As shown in step 1020, when the block color mode zero data 82 is received, the N-level color information generator 910 receives at least the block color offset value 78, the quantization value 76 and the error map values 80, including pixel color error values for each of the pixels in the block. In response, the N-level color information generator 910 generates a high color value 958, a mid-high color value 966, a mid-low color value 961 and a low color value 960, based on, for example, the equations previously described with regards to FIGS. 6 and 7.

However, when the block color mode one data 84 is received, the N-level color information generator 910 receives at least the high color value 58, the mid-color value 61, the low color value 60 and the bitmap values 62.

As shown in block 1040, the block color information generator 920 associates the high color value 58, the mid-high color value 966, the mid-low color value 967 and the low color value 960 with each pixel in the block, according to the error map values 80 based on the equations previously described with regards to FIGS. 6 and 7, when the block color mode zero data 82 is received.

As shown in step 1050, the block color information generator 920 associates at least one of: the high color value 58, the mid-color value 61 or the low color value 60 with each pixel in the block, according to the bit map values 62 when the block color mode one data 84 is received.

According to one embodiment, the N-level color information generator 910 may compute the mid-low color value 67 and the mid-high color value 66 as follows:

Mid-low color value=low color value−¼*high color value mid-high color value=⅜*low color value+ ⅝* high color value.

Alternatively, the mid-high color value 61 during mode one may be computed as follows:

Mid-high color value=⅝*low color value+⅜*high color value.

Figure 11:
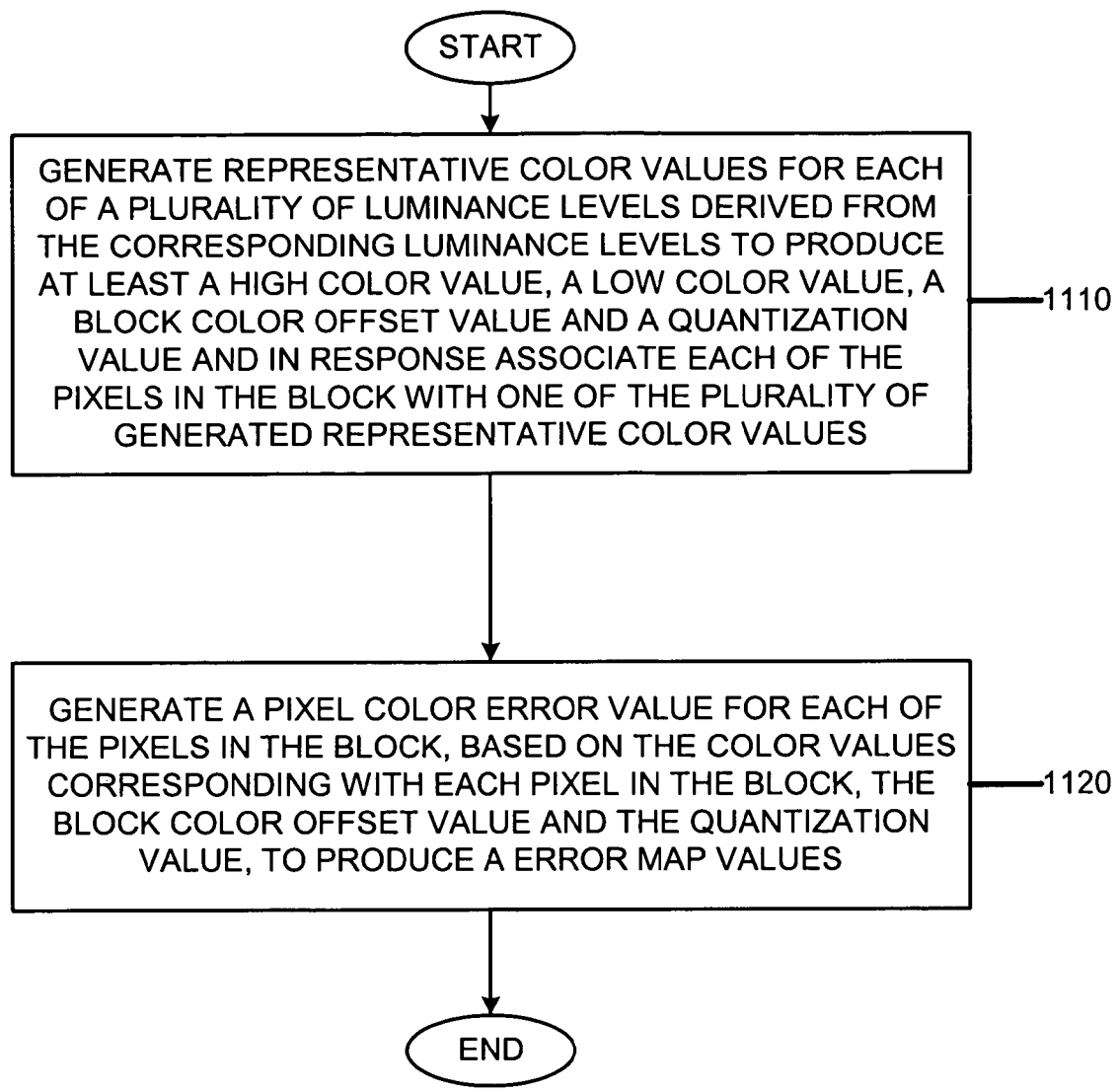
FIG. 11 is a flowchart illustrating an example of a method for compressing a plurality of pixels in a block (mode zero) in accordance with another exemplary embodiment of the invention.

FIG. 11 is a flowchart illustrating a method for encoding the plurality of pixels in a block according to mode zero. The method may be carried out by the encoder circuit 10 as shown in FIG. 1. However, any other suitable structure may also be used. It will be recognized that the method will be described as a series of operations beginning with block 110, but the operations may be performed in any suitable order and may be repeated in any suitable combination. As previously described above, the luminance-level-based representative color generator 20 generates the block color offset value 78, the quantization value 76, the error map values 80 when the block color mode zero data 82 is indicated. The representative color value generator 50 generates the mode zero data structure 86, as previously described. According to this embodiment, comparison between the mode zero color value 440 and the mode one color error value 450 is not required.

Figure 12:
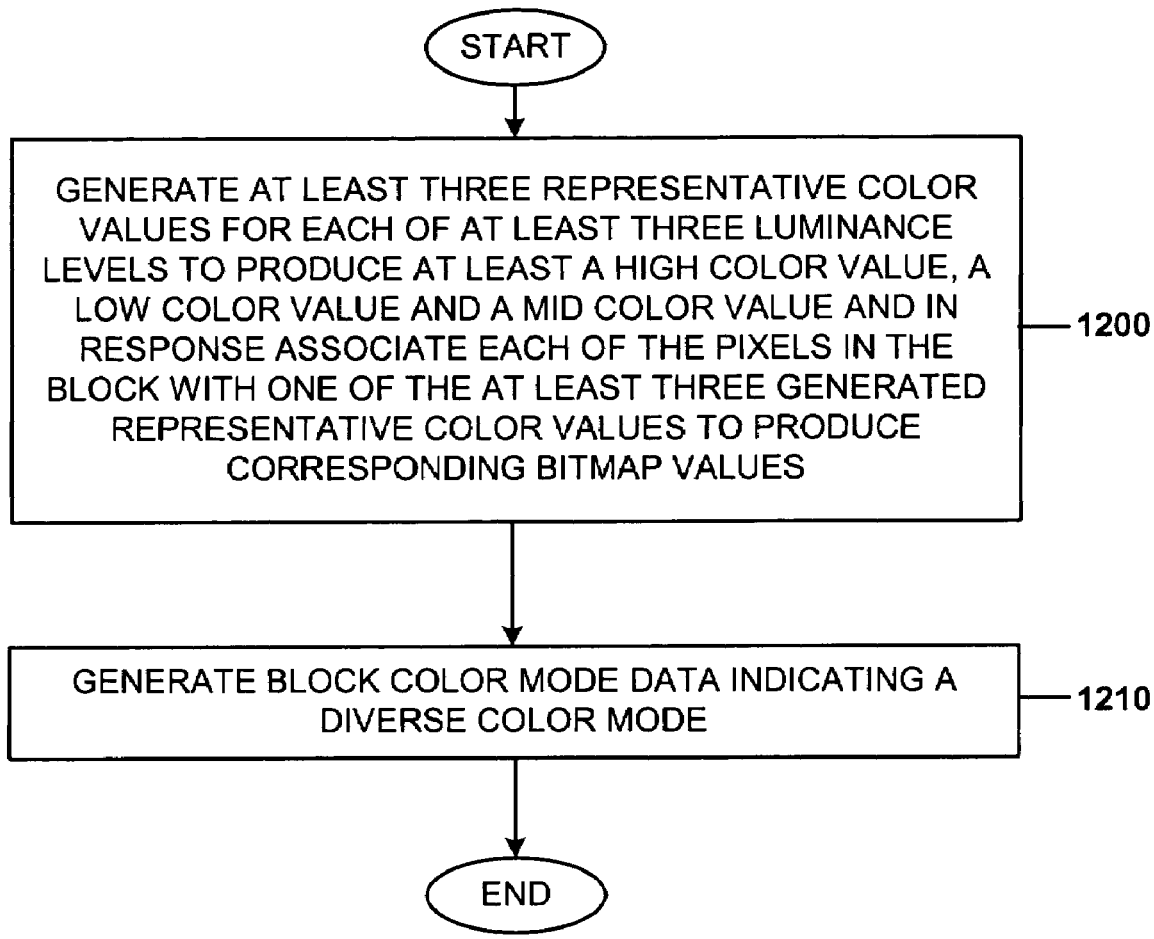
FIG. 12 is a flowchart illustrating an example of a method for compressing a plurality of pixels in a block (mode one) in accordance with another exemplary embodiment of the invention.

FIG. 12 illustrates a method of compressing a plurality of pixels in a block corresponding to mode one. The method may be carried out by the encoder 10, as shown in FIG. 2. However, any other suitable structure may also be used. It will be recognized that the method will be described as a series of operations, but the operations may be performed in any suitable order and may be repeated in any suitable combination. According to this embodiment, the mode based compressed data generator 30 generates the mode one data structure 88, including the block color mode one data 84, the high color value 58, the mid-color value 61, the low color value 60 and the bitmap value 62. In response, the transmitter 420 may transmit the mode one data structure 88. According to this embodiment, no comparison between the mode zero color error value 440 and the color mode one color error 450 is not required. The representative color value generator 50 generates the mode one data structure 88, as previously described.

It is understood that the implementation of other variations and modifications of the present invention and its various aspects will be apparent to those of ordinary skill in the art, and that the invention is not limited by the specific embodiments described. It is therefore contemplated to cover by the present invention any and all modifications, variations or equivalents that fall within the spirit and scope of the basic underlying principles disclosed and claimed herein.

The invention claimed is:

1. A method of compressing a plurality of pixels in a block, each pixel in the block having an original color value and a corresponding luminance level, the method comprising:

generating representative color values for each of a plurality of luminance levels derived from the corresponding luminance levels to produce at least a high color value and a low color value, and in response associating each of the pixels in the block with one of the plurality of generated representative color values to produce a block color offset value and a quantization value;

generating a pixel color error value for each of the pixels in the block, based on the original color values corresponding with each pixel in the block, the block color offset value and the quantization value, to produce error map values and a mode zero color error value;

generating at least three representative color values for each of at least three luminance levels, to produce a mode one color error value, and in response associating each of the pixels in the block with one of the at least three generated representative color values to produce corresponding bitmap values; and generating block color mode zero data when the mode zero color error value is less than the mode one color error value, otherwise generating block color mode one data.

2. The method of claim 1 including:

reassociating at least one pixel in the block with at least one other representative color value in response to generating the pixel color error value for each of the pixels in the block.

3. The method of claim 1, wherein at least one of: the mode zero color error value and the mode one color error value corresponds with at least one of: an absolute color error value, a mean square color error value, and a mean color error value.

4. The method of claim 1, wherein generating the representative color values includes averaging the color values corresponding with the pixels assigned to each of the luminance levels to generate an average color value for each of the luminance levels.

5. The method of claim 1, wherein generating the representative color values further includes selecting representative color values corresponding with at least one of: a minimum mode zero color error value and a minimum mode one color error value.

6. The method of claim 1, including:

sending a data structure including at least the block color offset value, the quantization value and the error map values in response to generating the block color mode zero data; and sending a data structure including at least the high color value, the low color value and the bitmap values in response to generating the block color mode one data.

7. A method of compressing a plurality of pixels in a block, each pixel in the block having an original color value and a corresponding luminance value, the method comprising:

generating representative color values for each of a plurality of luminance levels derived from the corresponding luminance levels to produce at least a high color value, a low color value, a block color offset value and a quantization value;

grouping each of the color values for the pixels in the block amongst the representative color values and, in response, selecting a grouping of color values such that the selected representative color values correspond with a minimum color error with respect to the color values in the block;

associating each of the pixels in the block with one of the plurality of selected representative color values to produce a mode zero color error value;

generating a pixel color error value for each of the pixels in the block, based on the original color values corresponding with each pixel in the block, the block color offset value and the quantization value, to produce error map values;

generating at least three representative color values for each of at least three luminance levels to produce a mode one color error value, and in response associating each of the pixels in the block with one of the at least three generated representative color values to produce corresponding bitmap values; and generating block color mode zero data when the mode zero color error value is less than the mode one color error value, otherwise generating block color mode one data.

8. The method of claim 7, including:
reassociating each pixel in the block with at least one other representative color level in response to generating the pixel color error value for each of the pixels in the block.

9. The method of claim 7, wherein generating the representative color values includes averaging the color values corresponding with the pixels assigned to each of the luminance levels to generate an average color value for each of the luminance levels.

10. The method of claim 7, wherein at least one of: the mode zero color error value and the mode one color error value corresponds with at least one of: an absolute color error value, a mean square color error value, and a mean color error value.

11. The method of claim 7, including:
sending a data structure including at least the block color offset value, the quantization value and the error map values in response to generating the block color mode zero data; and
sending a data structure including at least the high color value, the low color value and the bitmap values in response to generating the block color mode one data.

12. A method of compressing a plurality of pixels in a block, each pixel in the block having an original color value and a corresponding luminance value, the method comprising:
generating a plurality of representative luminance values derived from the corresponding luminance levels, and in response, associating each of the pixels in the block with one of the plurality of representative luminance values;
generating representative color values for each of the plurality of luminance levels to produce at least a high color value, a low color value, a block color offset value and a quantization value;
grouping each of the original color values for the pixels in the block amongst the representative luminance values, and in response selecting a grouping of original color values such that the corresponding representative color values correspond with a minimum color error with respect to the original color values in the block;
associating each of the pixels in the block with one of the plurality of selected representative color values to produce a mode zero color error value;
generating a pixel color error value for each of the pixels in the block, based on the original color values corresponding with each pixel in the block, the block color offset value and the quantization value, to produce error map values;
generating at least three representative color values for each of at least three luminance levels to produce a mode one color error value, and in response associating each of the pixels in the block with one of the at least three generated representative color values to produce corresponding bitmap values; and
generating block color mode zero data when the mode zero color error value is less than the mode one color error value, otherwise generating block color mode one data.

13. The method of claim 12, wherein generating the plurality of representative luminance values further includes:
sorting the plurality of pixels in the block according to the luminance values; and
grouping the sorted luminance values and in response, selecting the representative luminance values for each group of luminance values such that the selected plurality of representative luminance values corresponds with a minimum error luminance value in the block.

14. The method of claim 12, including:
reassigning each pixel in the block to at least one other representative luminance level in response to generating the pixel color error value for each of the pixels in the block.

15. The method of claim 12, wherein generating the representative color values for each of the luminance levels includes averaging the color values corresponding with the pixels assigned to each of the luminance levels to generate an average color value for each of the luminance levels.

16. The method of claim 12, wherein at least one of: the mode zero color error value and the mode one color error value corresponds with at least one of: an absolute color error value, a mean square color error value, and a mean color error value.

17. The method of claim 12, including:
sending a data structure including at least the block color offset value, the quantization value and the error map values in response to generating the block mode zero data; and
sending a data structure including at least the high color value, the low color value and the bitmap values in response to generating the block mode one data.

18. An encoder circuit to compress a plurality of pixels in a block, each pixel in the block having an original color value and a corresponding luminance level, the encoder circuit comprising:
a luminance level based representative color generator operative to:
generate representative color values for each of a plurality of luminance levels derived from the corresponding luminance levels to produce at least a high color value and a low color value, and in response associate each of the pixels in the block with one of the plurality of generated representative color values to produce a block color offset value and a quantization value;
generate a pixel color error value for each of the pixels in the block, based on the original color values corresponding with each pixel in the block, the block color offset value and the quantization value, to produce error map values and a mode zero color error value;
generate at least three representative color values for each of at least three luminance levels to produce a mode one color error value, and in response associate each of the pixels in the block with one of the at least three generated representative color values to produce corresponding bitmap values; and
a mode based compressed data generator operative to generate block color mode zero data when the mode zero color error value is less than the mode one color error value, otherwise generate block color mode one data.

19. The encoder circuit of claim 18, wherein the luminance-level-based representative color generator is operative to:
reassociate at least one pixel in the block with at least one other representative luminance level in response to generating the pixel color error value for each of the pixels in the block.

20. The encoder circuit of claim 18, wherein the luminance level based representative color generator is operative to generate at least one of: the mode zero color error value and the mode one color error value, according to at least one of: an absolute color error value, a mean square color error value and a mean color error value.

21. The encoder circuit of claim 18, wherein the luminance-level-based representative color generator generates the representative color values based on averaging the color values corresponding with the pixels assigned to each of the luminance levels to generate an average color value for each of the luminance levels.

22. The encoder circuit of claim 18, wherein the luminance-level-based representative color generator selects representative color values corresponding with at least one of: a minimum mode zero color error value and a minimum mode one color error value.

23. The encoder circuit of claim 18, further including:
memory operatively coupled to the luminance level based representative color generator, the memory having a data structure including:
at least the block color offset value, the quantization value and the error map values when the block color mode zero data is generated; and
at least the high color value, the low color value, and the bitmap values when the block color mode one data is generated.

24. An encoder circuit to compress a plurality of pixels in a block, each pixel in the block having an original color value and a corresponding luminance level, the encoder circuit comprising:
a luminance-based pixel grouping generator operative to generate a plurality of representative luminance values derived from the corresponding luminance levels, and in response associate each of the pixels in the block with one of the plurality of representative luminance values;
a representative color generator, operatively coupled to the luminance-based pixel grouping generator and operative to:
generate representative color values for each of the plurality of luminance levels to produce at least a high color value, a low color value, a block color offset value and a quantization value;
group each of the original color values for the pixels in the block amongst the representative luminance values and, in response, select a grouping of original color values such that the corresponding representative color values correspond with a minimum color error with respect to the color values in the block;
associate each of the pixels in the block with one of the plurality of selected representative color values to produce a mode zero color error value;
generate a pixel color error value for each of the pixels in the block, based on the original color values corresponding with each pixel in the block, the block color offset value and the quantization value, to produce error map values; and
generate at least three representative color values for each of at least three luminance levels to produce a mode one color error value, and in response associate each of the pixels in the block with one of the at least three generated representative color values to produce corresponding bitmap values; and
a mode based compressed data generator operative to generate block color mode zero data when the mode zero color error value is less than the mode one color error value, otherwise generate block color mode one data.

25. The encoder circuit of claim 24, wherein the luminance based pixel grouping generator is operative to:
reassociate at least one pixel in the block with at least one other representative luminance value in response to generating the pixel color error value for each of the pixels in the block.

26. The encoder circuit of claim 24, wherein the representative color value generator is operative to generate at least one of: the mode zero color error value and the mode one color error value, according to at least one of: an absolute color error value, a mean square color error value and a mean color error value.

27. The encoder circuit of claim 24,
memory operatively coupled to the mode based compressed data generator, the memory having a data structure including:
at least the block color offset value, the quantization value and the error map values including the pixel color error values for each of the pixels in the block in response to the generated block color mode zero data; and
at least the high color value, the low color value and the bitmap values in response to generating the block color mode one data.

28. Memory containing instructions executable by one or more processing devices that cause the one or more processing devices to:
receive a plurality of pixels in a block, each pixel in the block having an original color value and a corresponding luminance level;
generate representative color values for each of a plurality of luminance levels derived from the corresponding luminance levels to produce at least a high color value and a low color value, and in response associate each of the pixels in the block with one of the plurality of generated representative color values to produce a block color offset value and a quantization value;
generate a pixel color error value for each of the pixels in the block, based on the original color values corresponding with each pixel in the block, the block color offset value and the quantization value, to produce error map values and a mode zero color error value;
generate at least three representative color values for each of at least three luminance levels to produce a mode one color error value, and in response associate each of the pixels in the block with one of the at least three generated representative color values to produce corresponding bitmap values; and
generate block color mode zero data when the mode zero color error value is less than the mode one color error value, otherwise generate the block color mode one data.

29. The memory of claim 28 containing executable instructions that cause the one or more processing devices to:
reassign at least one pixel in the block to at least one other representative color value in response to generating the pixel color error value for each of the pixels in the block.

30. The memory of claim 28 containing executable instructions that cause the one or more processing devices to send a data structure including:
at least the block color offset value, the quantization value and the error map values in response to generating the block mode zero data; and
at least the high color value, the low color value and the bitmap values in response to generating the block color mode one data.

31. A decoding method for generating a plurality of pixels in a block comprising:
receiving at least one of: block color mode zero data and block color mode one data;
in response to receiving the block color mode zero data:
receiving at least a block color offset value, a quantization value and error map values, and in response generating a high color value, a mid-high color value, a mid-low color value and a low color value; and associating the generated high color value, the generated mid-high color value, the generated mid-low color value and the generated low color value with each pixel in the block according to the error map values; and in response to receiving the block color mode one data, receiving at least a high color value, a mid-low color value, a low color value and bitmap values and in response associating at least one of: the received high color value, the received mid-low color value and the received low color value with each pixel in the block according to the bitmap values.

32. The decoder method of claim 31, including generating block color values for each pixel in the block in response to associating each of the pixels in the block in accordance with at least one of: the error map values and the bitmap values.

33. A decoder circuit including:
an N-level color information generator, operative to:
receive at least one of: block color mode zero data and block color mode one data; in response to receiving the block color mode zero data:
receive at least a block color offset value, a quantization value and error map values including pixel color error values for each of the pixels in the block, and in response generate a high color value, a mid-high color value, a mid-low color value and a low color value;

in response to receiving the block color mode one data:
receive at least a high color value, a mid color value, a low color value and bitmap values; and a block color information generator, operatively coupled to the N-level color information generator, and operative to:
associate the generated high color value, the generated mid-high color value, the generated mid-low color value and the generated low color value according to the error map values in response to the block color mode zero data; and
associate at least one of: the received high color value, the received mid-low color value and the received low color value with each pixel in the block according to the bitmap values in response to the block color mode one data.

34. The decoder circuit of claim 33, wherein the N-level color information generator is operative to: generate block color values for each pixel in the block in response to associating each of the pixels in the block in according with at least one of: the error map values and the bitmap values.

35. A graphics processor operative to compress a plurality of pixels in a block, each pixel in the blocking having a corresponding original color value and a corresponding luminance value, the graphics processor including:
an encoder circuit comprising:
a luminance level based representative color generator operative to:
generate representative color values for each of a plurality of luminance levels derived from the corresponding luminance levels to produce at least a high color value and a low color value and in response associate each of the pixels in the block with one of the plurality of generated representative color values to produce a block color offset value and a quantization value;
generate a pixel color error value for each of the pixels in the block, based on the original color values corresponding with each pixel in the block, the block color offset value and the quantization value, to produce error map values and a mode zero color error value;
generate at least three representative color values for each of at least three luminance levels to produce a mode one color error value, and in response associate each of the pixels in the block with one of the at least three generated representative color values to produce corresponding bitmap values; and
a mode based compressed data generator operative to:
generate block color mode zero data when the mode zero color error value is less than the mode one color error value, otherwise generate the block color mode one data.

36. The graphics processor of claim 35, further including:
memory operatively coupled to the block color type generator, the memory having a data structure including:
at least the block color offset value, the quantization value and the error map values including the pixel color error values for each of the pixels in the block in response to the generated block color mode zero data; and
at least the high color value, the low color value and the bitmap values in response to the generated block color mode zero data.

37. A network element operative to compress a plurality of pixels in a block, each pixel in the blocking having a corresponding original color value and a corresponding luminance value, the network element including:
an encoder circuit comprising:
a luminance level based representative color generator operatively coupled to the receiver and operative to:
generate representative color values for each of a plurality of luminance levels derived from the corresponding luminance levels to produce at least a high color value and a low color value and in response associate each of the pixels in the block with one of the plurality of generated representative color values to produce a block color offset value and a quantization value;
generate a pixel color error value for each of the pixels in the block, based on the original color values corresponding with each pixel in the block, the block color offset value and the quantization value, to produce error map values and a mode zero color error value;
generate at least three representative color values for each of at least three luminance levels to produce a mode one color error value, and in response associate each of the pixels in the block with one of the at least three generated representative color values to produce corresponding bitmap values;
a mode based compressed data generator operative to:
generate block color mode zero data when the mode zero color error value is less than the mode one color error value, otherwise generate block color mode one data; and
a transmitter, operatively coupled to the mode based compressed data generator and operative to transmit at least one of: (a) at least the block color offset value, the quantization value and the error map values and (b) at least the high color value, the low color value and the bitmap values.

38. The network element of claim 37, further including:
memory operatively coupled to the block color type generator, the memory having a data structure including:
at least the block color offset value, the quantization value and the error map values including the pixel color error values for each of the pixels in the block in response to the generated block color mode zero data; and at least the high color value, the low color value and the bitmap values in response to the generated block color mode one data.

39. A method of compressing a plurality of pixels in a block, each pixel in the block having an original corresponding color value and a corresponding luminance value, the method comprising:

generating representative color values for each of a plurality of luminance levels derived from the corresponding luminance levels to produce at least a high color value, a low color value, a block color offset value and a quantization value and in response associating each of the pixels in the block with one of the plurality of generated representative color values; and generating a pixel color error value for each of the pixels in the block, based on the original color values corresponding with each pixel in the block, the block color offset value and the quantization value, to produce error map values.

40. The method of claim 39 wherein generating the representative color values further includes selecting representative color values corresponding with at least one of: a minimum mode zero color error value and a minimum mode one color error value.

41. The method of claim 39 including:

reassociating at least one pixel in the block with at least one other representative color value.

42. The method of claim 39, wherein generating the representative color values includes averaging the color values corresponding with the pixels assigned to each of the luminance levels to generate an average color value for each of the at least four luminance levels.

43. The method of claim 39, including: sending a data structure including at least the block color offset value, the quantization value and the error map values.

44. A method of compressing a plurality of pixels in a block, each pixel in the block having an original corresponding color value and a corresponding luminance value, the method comprising:

generating at least three representative color values for each of at least three luminance levels derived from the corresponding luminance levels to produce at least a high color value, a low color value and a mid color value and in response associating each of the pixels in the block with one of the at least three generated representative color values to produce corresponding bitmap values; and generating block color mode data indicating a diverse color mode.

45. The method of claim 44 including: sending the at least the high color value, the mid color value, the low color value and the bitmap values as a data bit structure.

* * * * *

UNITED STATES PATENT AND TRADEMARK OFFICE
CERTIFICATE OF CORRECTION

PATENT NO.       : 7,606,429 B2
APPLICATION NO.  : 11/090378
DATED            : October 20, 2009
INVENTOR(S)      : Aleksic et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1094 days.

Signed and Sealed this

Twelfth Day of October, 2010

David J. Kappos
*Director of the United States Patent and Trademark Office*